(12) United States Patent
Tsai

(10) Patent No.: US 8,605,929 B2
(45) Date of Patent: Dec. 10, 2013

(54) FILM-TYPE AUDIO OUTPUT APPARATUS

(75) Inventor: Liang-Tan Tsai, New Taipei (TW)

(73) Assignee: Global Target Enterprise Inc., New Taipei (TW)

( * ) Notice: Subject to any disclaimer, the term of this patent is extended or adjusted under 35 U.S.C. 154(b) by 0 days.

(21) Appl. No.: 13/282,281

(22) Filed: Oct. 26, 2011

(65) Prior Publication Data

US 2012/0039502 A1  Feb. 16, 2012

Related U.S. Application Data

(62) Division of application No. 11/668,447, filed on Jan. 29, 2007, now Pat. No. 8,073,177.

(51) Int. Cl.
*H04R 25/00* (2006.01)

(52) U.S. Cl.
USPC .............................. 381/349; 381/353; 381/370

(58) Field of Classification Search
USPC ......... 381/370–374, 391–392, 345, 347–349, 381/352–354, 423–426, 429, 431
See application file for complete search history.

(56) References Cited

U.S. PATENT DOCUMENTS 5,420,935 A * 5/1995 Shinohara et al. ............ 381/370

\* cited by examiner

*Primary Examiner* — Suhan Ni
(74) *Attorney, Agent, or Firm* — Ming Chow; Sinorica, LLC

(57) ABSTRACT

A film-type audio output apparatus includes an audio output device, at least one speaker unit, and at least one film. The at least one speaker unit is positioned at any side of the audio output device. The speaker unit can be an embedded speaker unit. The at least one film can be positioned at any or more places of an inner side and an outer side of the audio output device. When the speaker unit of the audio output device releases sound, the film positioned on the audio output device can get vibration of the sound so that the inside of the audio output device can generate resonance. Thus, the audio output apparatus can generate softer undertone and wider diapason.

1 Claim, 36 Drawing Sheets

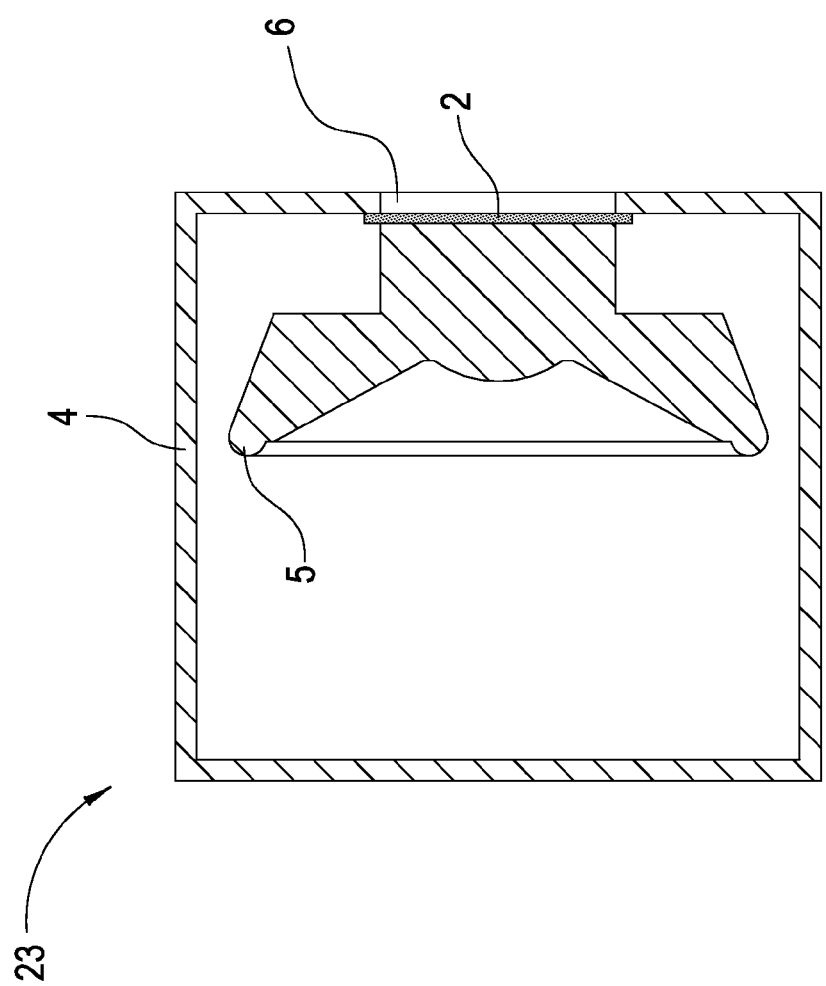

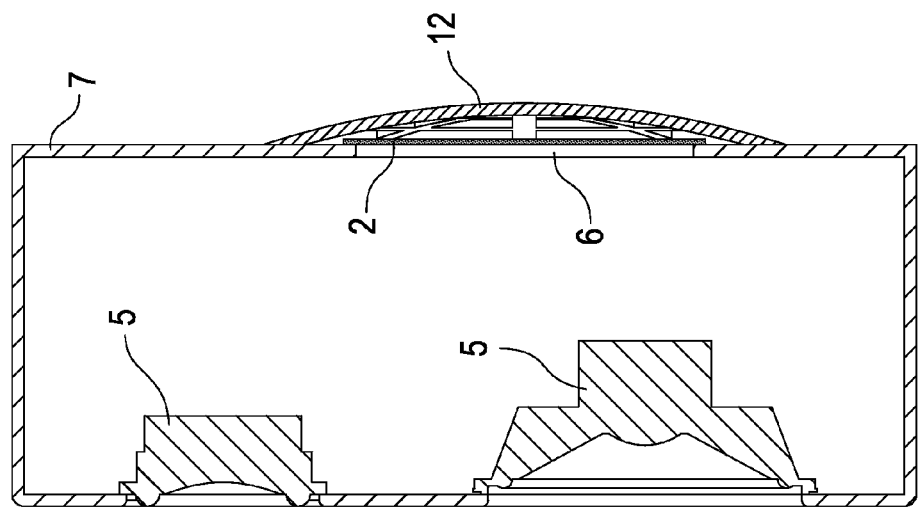
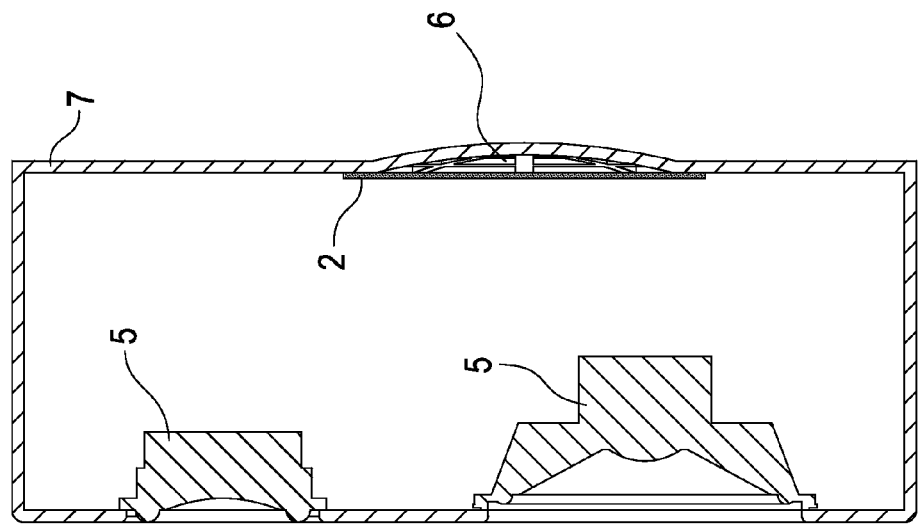

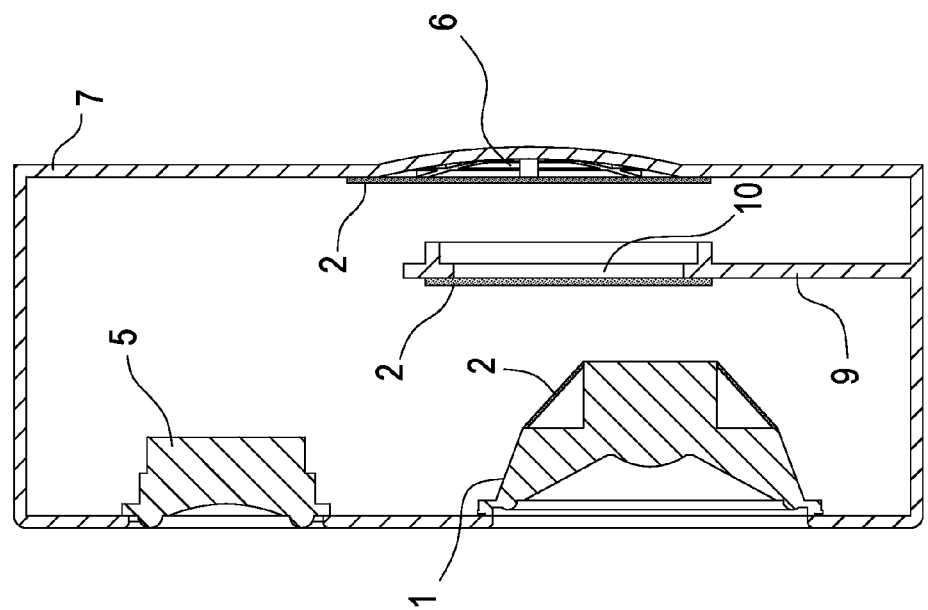
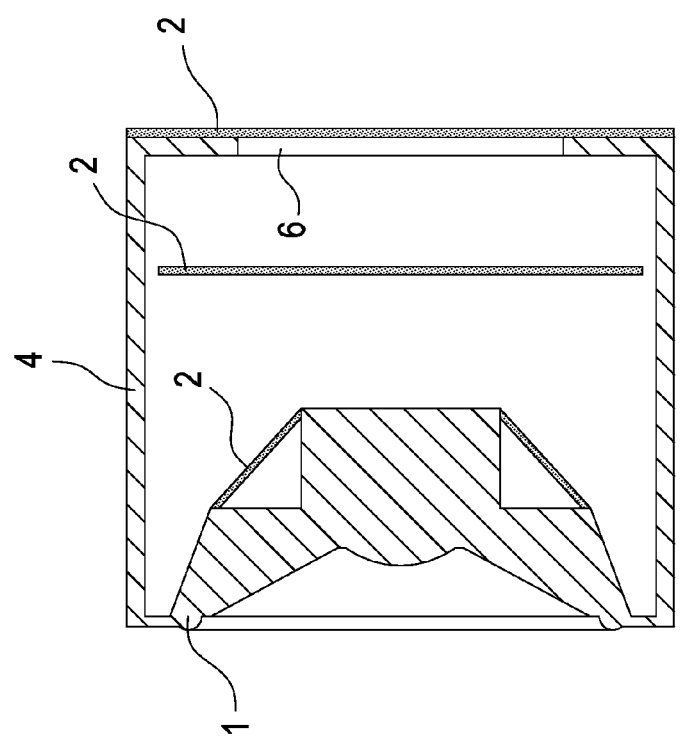
FIG.10A
FIG.10B

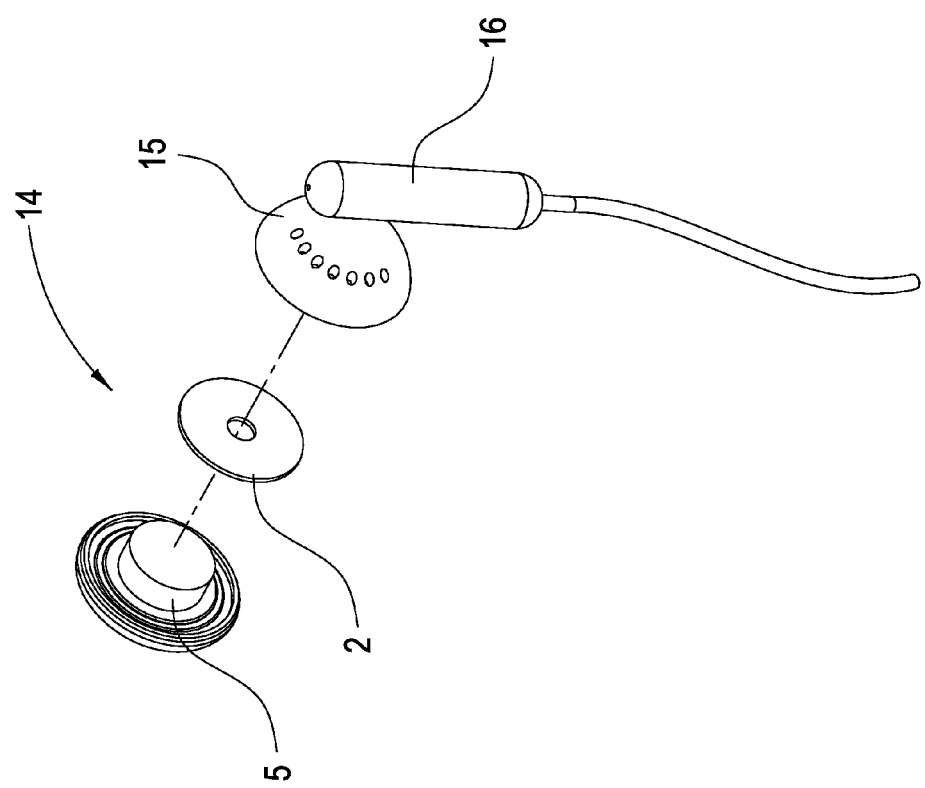

FILM-TYPE AUDIO OUTPUT APPARATUS

The current application is a divisional application of, and claims a priority to U.S. Ser. No. 11/668,447 filed on Jan. 29, 2007 now U.S. Pat. No. 8,073,177.

BACKGROUND

1. Field of the Invention

The present invention relates to a film-type audio output apparatus and, more particularly, to an audio output apparatus with at least one soft or elastic film positioned at any or more places of an inner side and an outer side thereof so as to have efficacies such as softer undertone and wider diapason.

2. Description of the Prior Art

At present, there are various speakers in the market. A known speaker generally includes a speaker box and at least one speaker unit positioned at the front side of the speaker box. When the speaker unit begins to work, it can release the sound and the consumer can thereby listen to various music styles.

However, most of the speaker boxes purchased by the consumer cannot exert the sound effectively via the known structures and cannot generate resonance of the sound. Also, the diapason of the sound of the speaker boxes is not wide enough. Therefore, the consumer cannot obtain high-grade feeling in listening, though a lot of money has been spent.

What is needed, therefore, is an improved film-type audio output apparatus.

BRIEF SUMMARY

A film-type audio output apparatus according to an embodiment of the present invention includes an audio output device, at least one speaker unit, and at least one film. The at least one speaker unit is positioned at any side of the audio output device. The speaker unit can be an embedded speaker unit. The at least one film can be positioned at any or more places of an inner side and an outer side of the audio output device. Alternatively, a combined part combining the film can be positioned at any or more places of the inner side and the outer side of the audio output device. When the speaker unit of the audio output device releases sound, the film positioned on the audio output device can get vibration of the sound so that an inside of the audio output device can generate resonance. Thus, the audio output device can generate softer undertone and wider diapason.

These features and advantages of the present invention will be fully understood and appreciated from the following detailed description of the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 9A to 9D are cross sectional views of a film-type audio output apparatus in accordance with a ninth embodiment of the present invention.

FIGS. 10A and 10B are cross sectional views of mutual and equivalent applications of the present film-type audio output apparatus.

FIGS. 11A to 11G are isometric views of a film-type audio output apparatus in accordance with a tenth embodiment of the present invention.

DETAILED DESCRIPTION

Reference will now be made to the figures to describe the present invention in detail.

Figure 1:
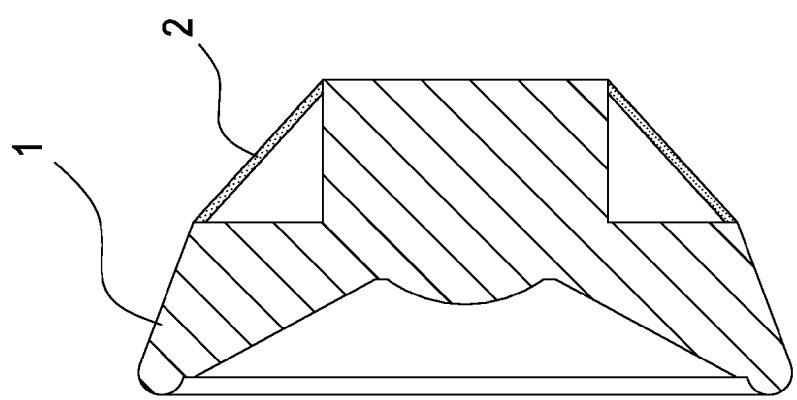
FIGS. 1A to 1C are side, cross sectional views of a film-type audio output apparatus in accordance with a first embodiment of the present invention.
Figure 1:
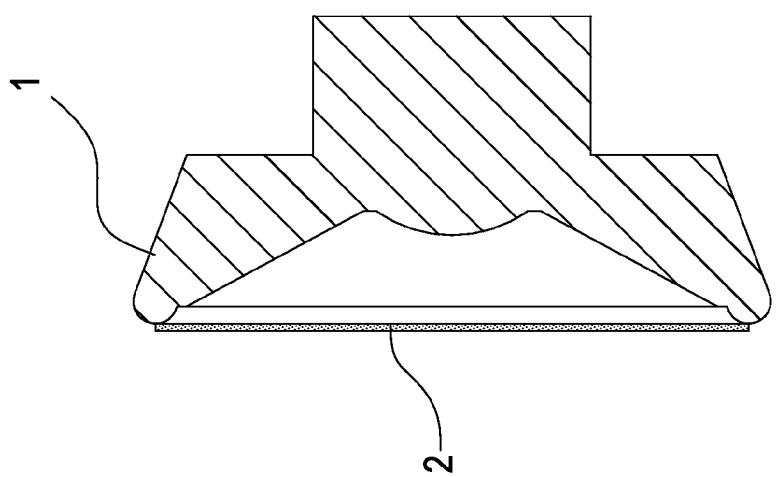
Figure 1:
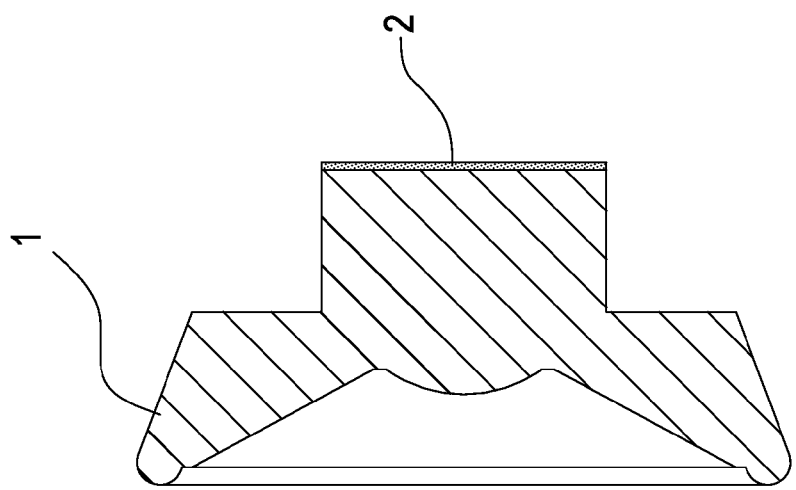

Referring to FIG. 1A, a film-type audio output apparatus in accordance with a first embodiment of the present invention is shown. The film-type audio output apparatus mainly includes an embedded speaker unit 1. At least one film 2 is positioned at any or more places of sides of the embedded speaker unit 1. The film 2 can be made from any soft or elastic material. The present film-type audio output apparatus is thus formed via the above-mentioned components. When the embedded speaker unit 1 releases the sound, the film 2 can get vibration of the sound and begin to vibrate itself so that an inside of the audio output device can generate resonance of the sound. Thus, the audio output apparatus has efficacies of softer undertone portion and wider diapason.

Referring to FIGS. 1B and 1C, the film-type audio output apparatus in accordance with the first embodiment of the present invention is shown in different configurations. In these configurations, the film-type audio output apparatus includes an embedded speaker unit 1. At least one film 2 is positioned at the front side or the rear side of the embedded speaker unit 1. The film 2 is made from any soft or elastic material. The present film-type audio output apparatus is thus formed via the above-mentioned components.

Figure 2A:
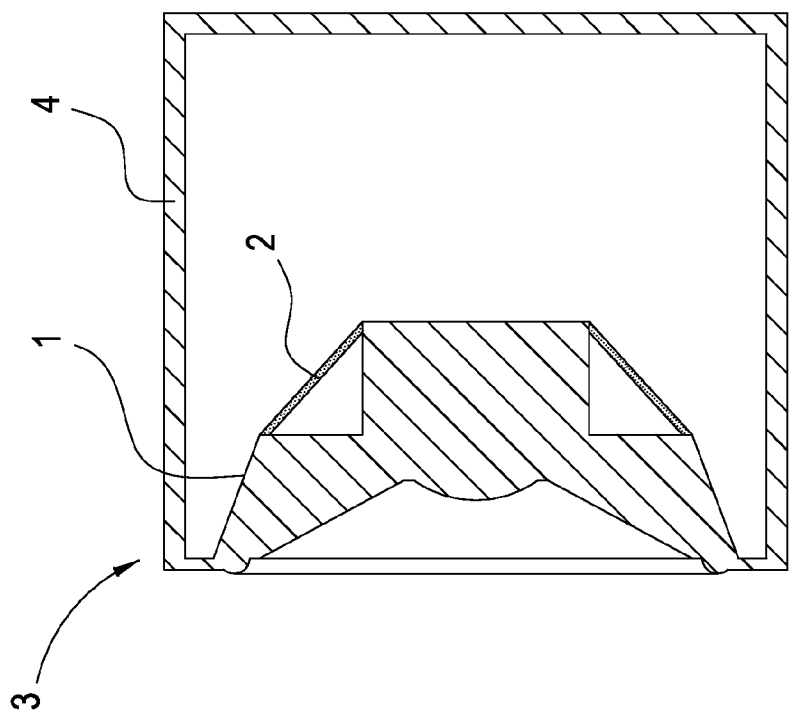
FIGS. 2A and 2B are side, cross sectional views of a film-type audio output apparatus in accordance with a second embodiment of the present invention.
Figure 2:
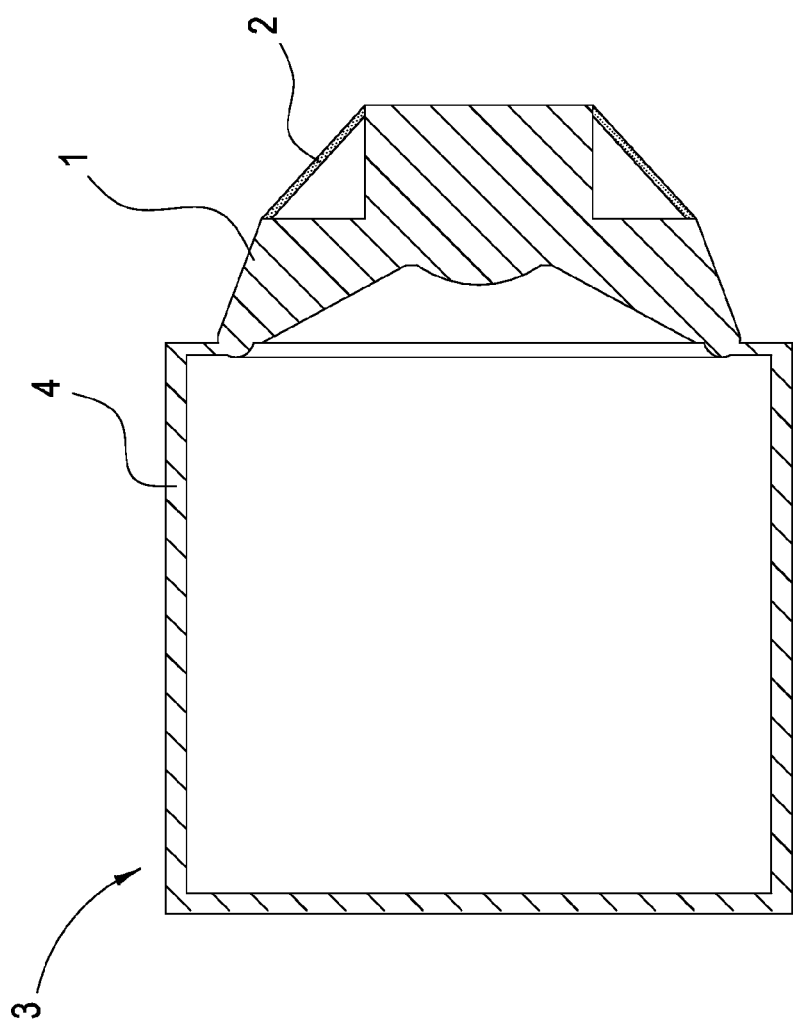

Referring to FIG. 2A, a film-type audio output apparatus in accordance with a second embodiment of the present invention is shown. The film-type audio output apparatus includes an embedded speaker box 3. The embedded speaker box 3 includes an embedded speaker unit 1 positioned thereon and having at least one film 2. The embedded speaker unit 1 includes a plank 4 extending rearwards from an edge thereof. The film 2 is made from any soft or elastic material. The present film-type audio output apparatus is thus formed via the above-mentioned components.

Referring to FIG. 2B, the film-type audio output apparatus in accordance with the second embodiment of the present invention is shown in a different configuration. In this configuration, the film-type audio output apparatus includes an embedded speaker box 3. The embedded speaker box 3 includes an embedded speaker unit 1 reversely positioned thereon and having at least one film 2. The embedded speaker unit 1 includes a plank 4 extending frontwards from an edge thereof. The film 2 is made from any soft or elastic material. The present film-type audio output apparatus is thus formed via the above-mentioned components.

Figure 3A:
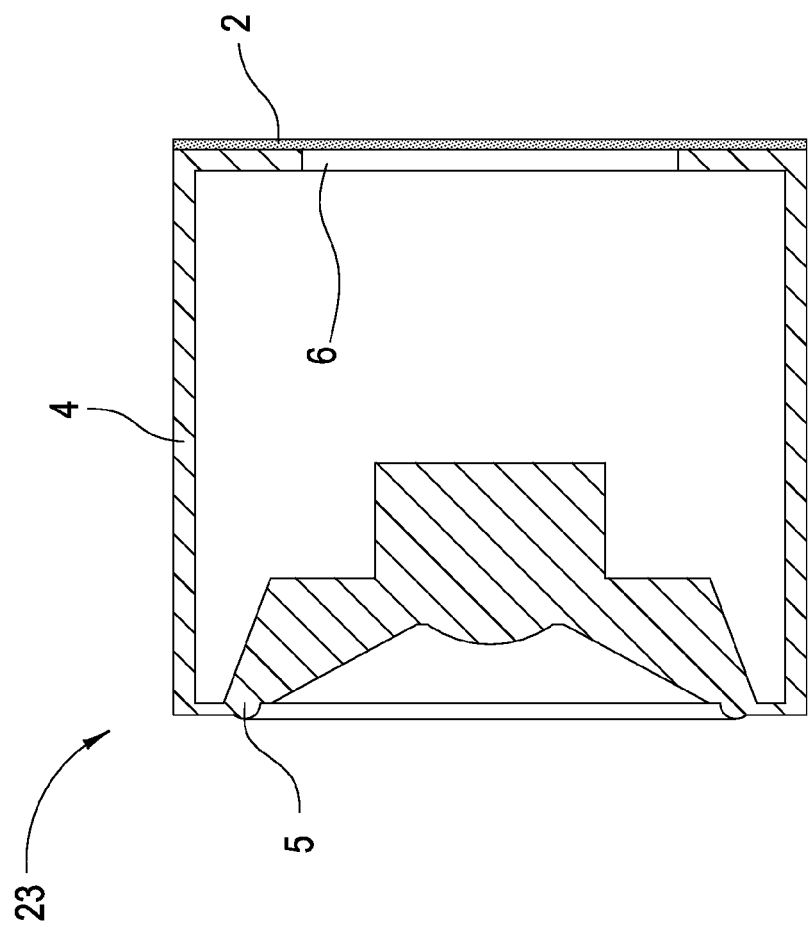
FIGS. 3A to 3E are side, cross sectional views of a film-type audio output apparatus in accordance with a third embodiment of the present invention.

Referring to FIG. 3A, a film-type audio output apparatus in accordance with a third embodiment of the present invention is shown. The film-type audio output apparatus includes a speaker box 23 with at least one film 2, and a speaker unit 5. The speaker unit 5 includes a plank 4 extending rearwards from an edge thereof. At least one gas-permeable hole 6 is defined in any or more places of the plank 4. The at least one film 2 is positioned at any or more places of an inner side and an outer side of the gas-permeable hole 6. The film 2 is made from any soft or elastic material. The present film-type audio output apparatus is thus formed via the above-mentioned components.

Figure 3B:
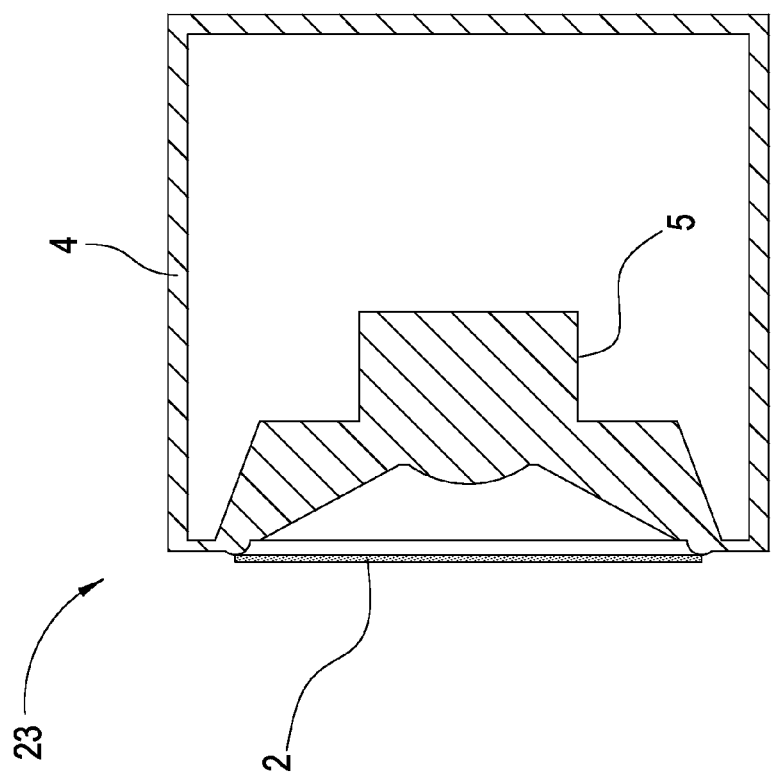
Figure 3:
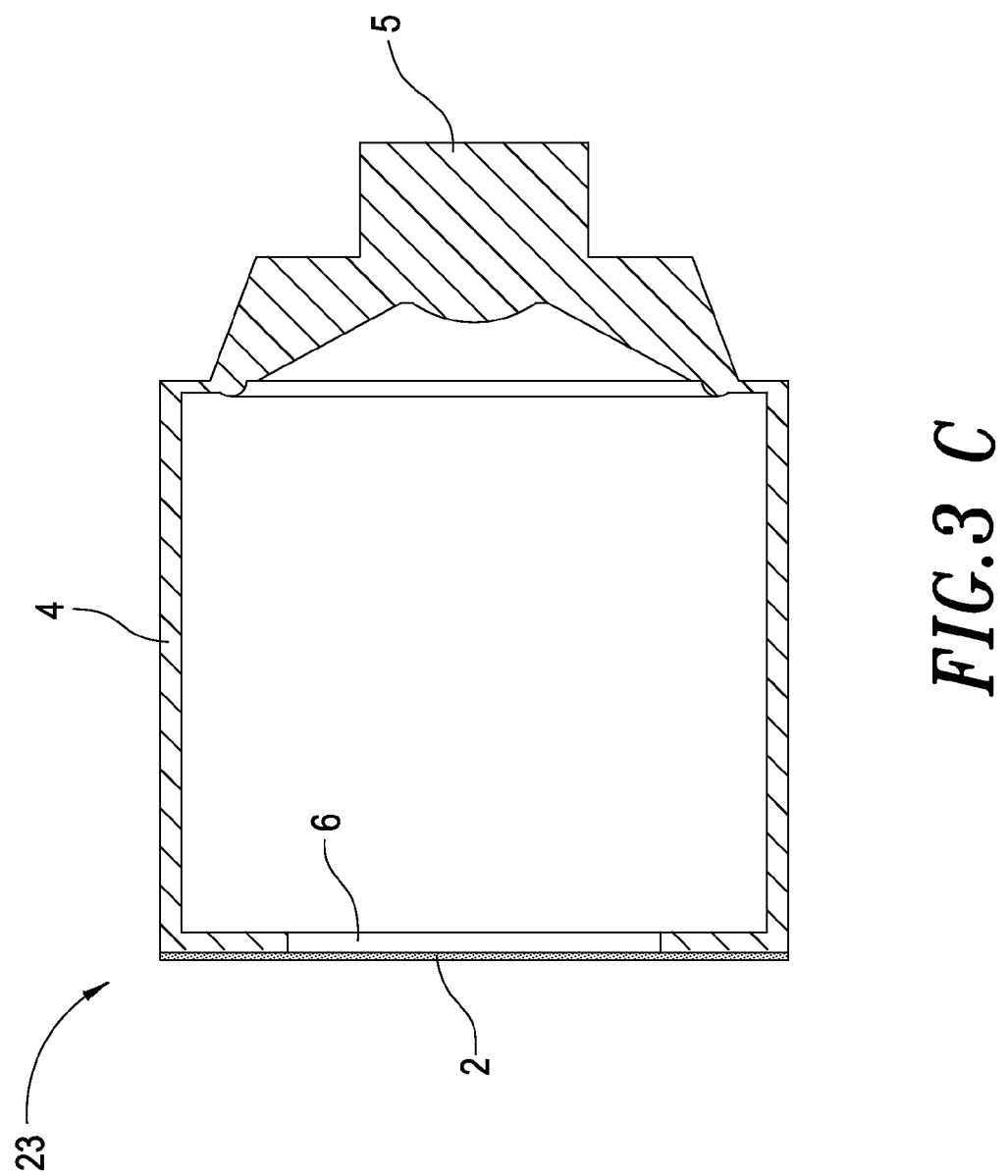
Figure 3:
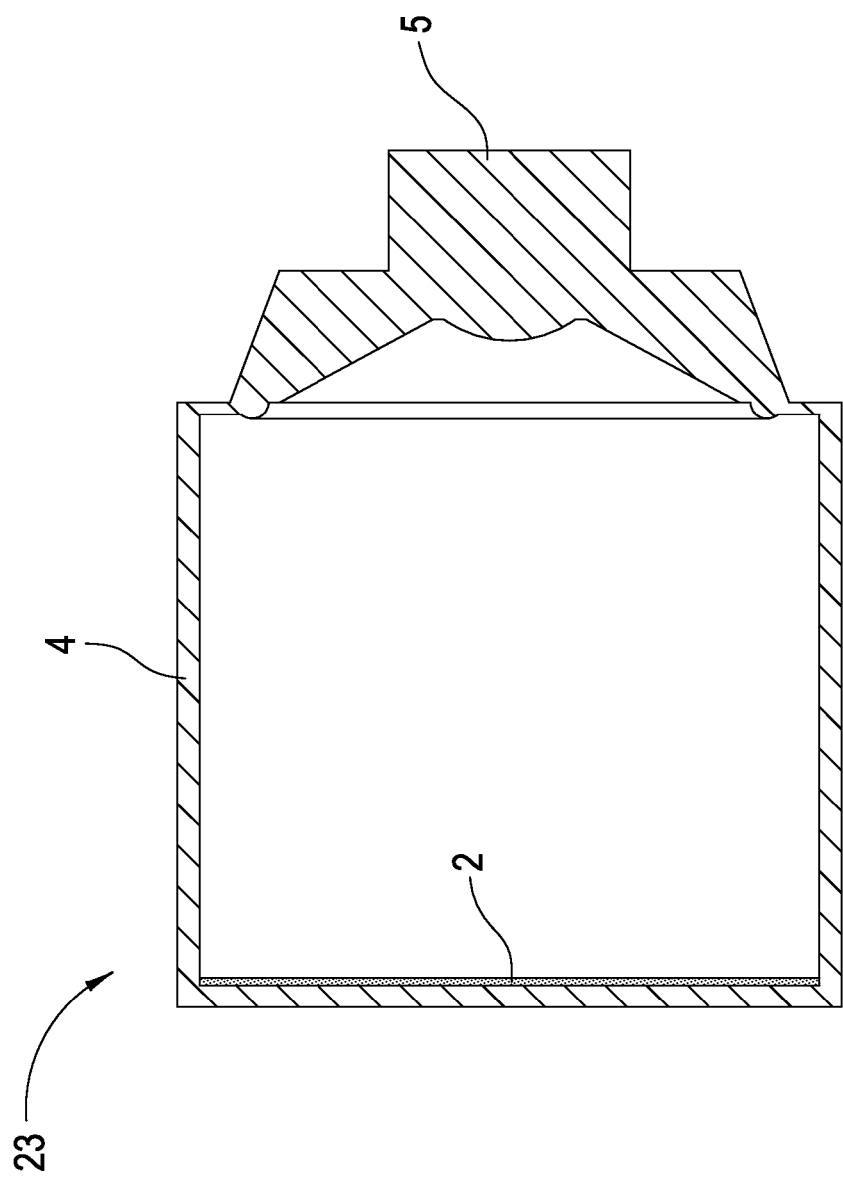

Referring to FIG. 3B, the film-type audio output apparatus in accordance with the third embodiment of the present invention is shown in a different configuration. In this configuration, the film-type audio output apparatus includes a speaker box 23 with at least one film 2, and a speaker unit 5. The at least one film 2 can be positioned at the front of the speaker unit 5. The speaker unit 5 includes a plank 4 extending rearwards from an edge thereof. The film 2 is made from any soft or elastic material. The present film-type audio output apparatus is thus formed via the above-mentioned components.

Referring to FIG. 3C, the film-type audio output apparatus in accordance with the third embodiment of the present invention is shown in a different configuration. In this configuration, the film-type audio output apparatus includes a speaker box 23 with at least one film 2, and a speaker unit 5. The speaker unit 5 includes a plank 4 extending frontwards from an edge thereof. At least one gas-permeable hole 6 is defined in any or more places of the plank 4. The at least one film 2 is positioned at any or more places of an inner side and an outer side of the gas-permeable hole 6. The film 2 is made from any soft or elastic material. The present film-type audio output apparatus is thus formed via the above-mentioned components.

Referring to FIG. 3D, the film-type audio output apparatus in accordance with the third embodiment of the present invention is shown in a different configuration. In this configuration, the film-type audio output apparatus includes a speaker box 23 with at least one film 2, and a speaker unit 5. The speaker unit 5 includes a plank 4 extending frontwards from an edge thereof. The at least one film 2 is positioned at any or more places of an inner side of the plank 4. The film 2 is made from any soft or elastic material. The present film-type audio output apparatus is thus formed via the above-mentioned components.

Referring to FIG. 3E, the film-type audio output apparatus in accordance with the third embodiment of the present invention is shown in a different configuration. In this configuration, the film-type audio output apparatus includes a speaker box 23 with at least one film 2, and a speaker unit 5. The speaker unit 5 includes a plank 4 extending frontwards from a back end thereof. At least one gas-permeable hole 6 is defined in any or more places of the plank 4. The at least one film 2 is positioned at any or more places of an inner side and an outer side of the gas-permeable hole 6. The film 2 is made from any soft or elastic material. The present film-type audio output apparatus is thus formed via the above-mentioned components. Alternatively, the type of the speaker unit 5 shown in FIGS. 3A to 3E can also be the type of the embedded speaker unit 1.

Figure 4:
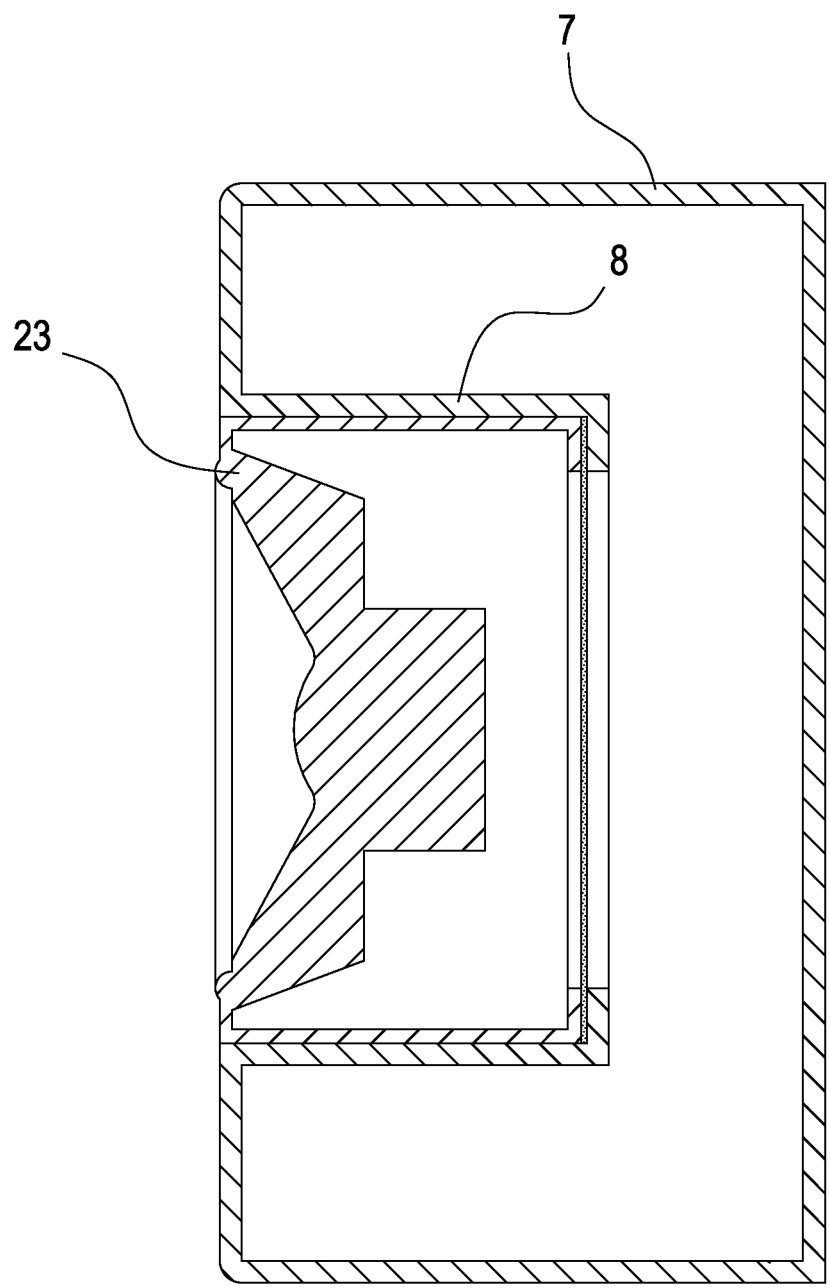
FIG. 4 is a side, cross sectional view of a film-type audio output apparatus in accordance with a fourth embodiment of the present invention.

Referring to FIG. 4, a film-type audio output apparatus in accordance with a fourth embodiment of the present invention is shown. The film-type audio output apparatus includes a case 7, and a speaker box 23 with at least one film. Any side of the case 7 is concaved inby so as to define at least one receiving groove 8 configured for receiving the at least one speaker box 23 therein. The above-mentioned speaker box 23 can be any type illustrated in FIGS. 3A to 3E.

Figure 5:
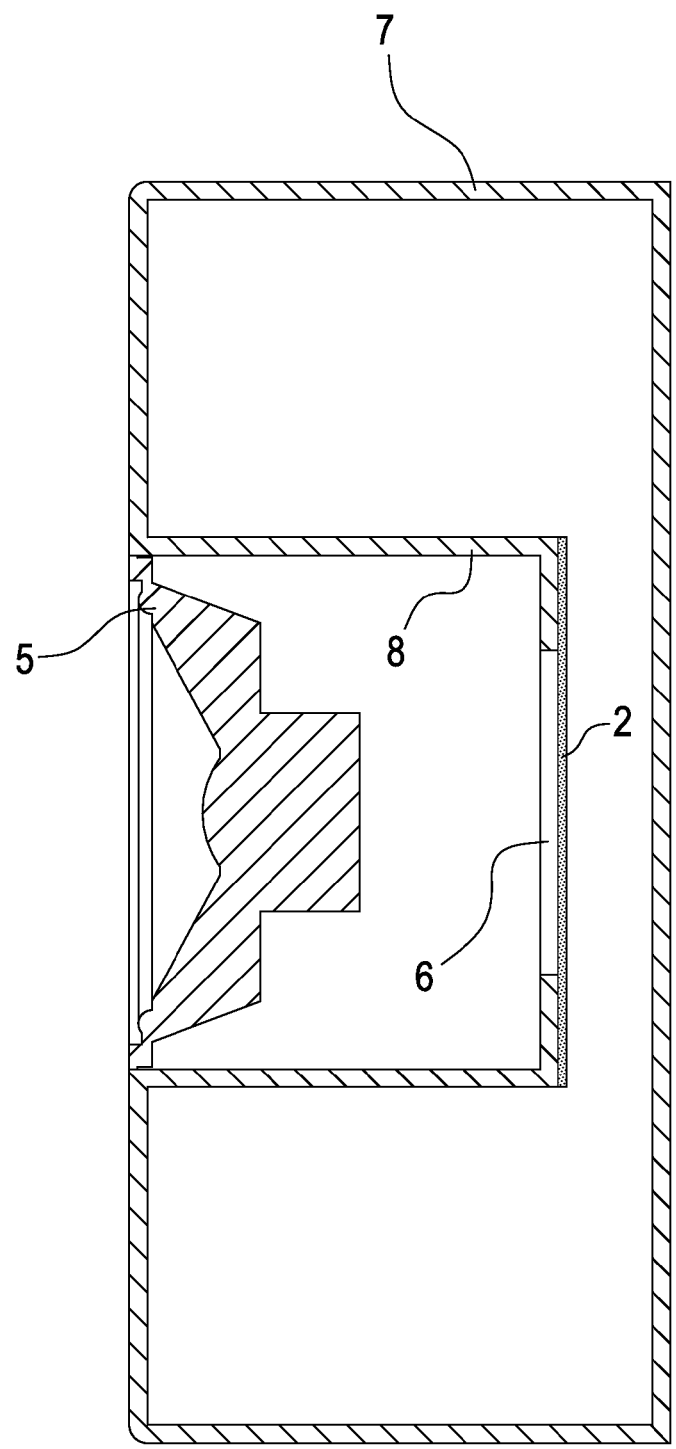
FIGS. 5A to 5F are side, cross sectional views of a film-type audio output apparatus in accordance with a fifth embodiment of the present invention.
Figure 5:
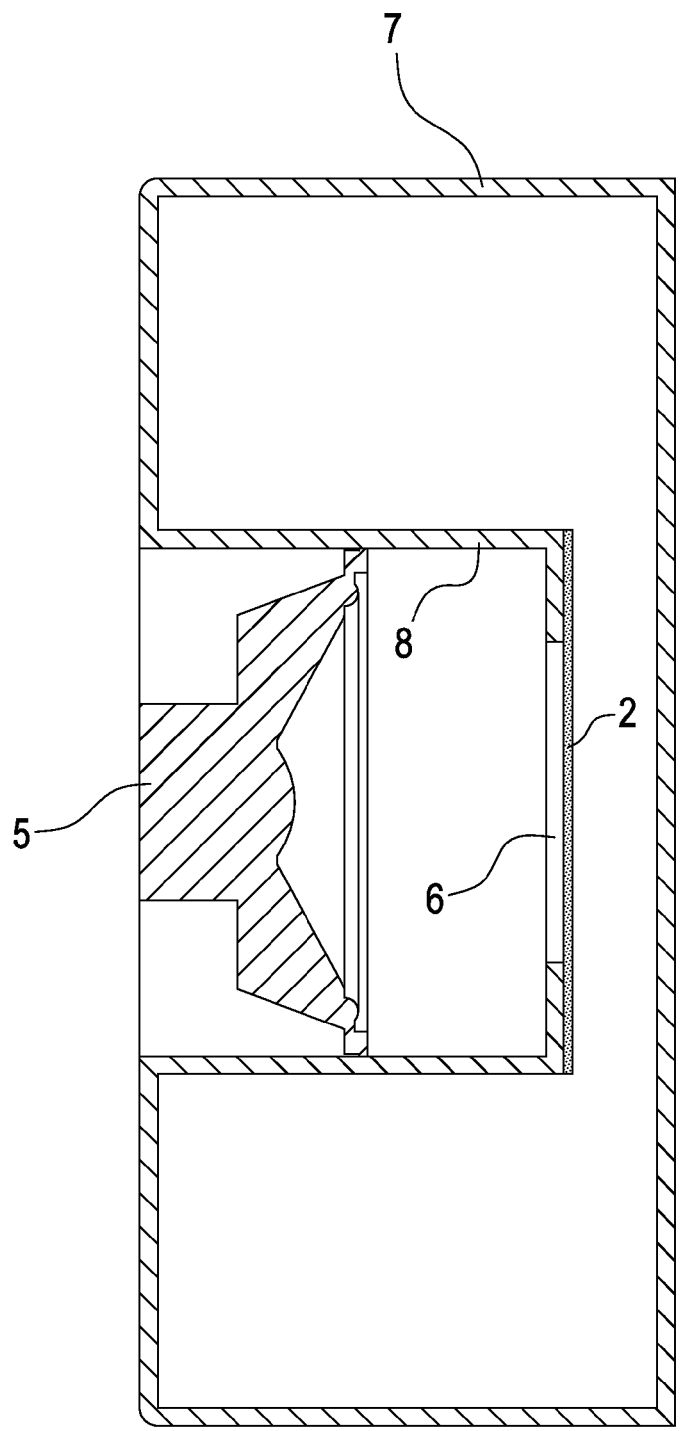
Figure 5:
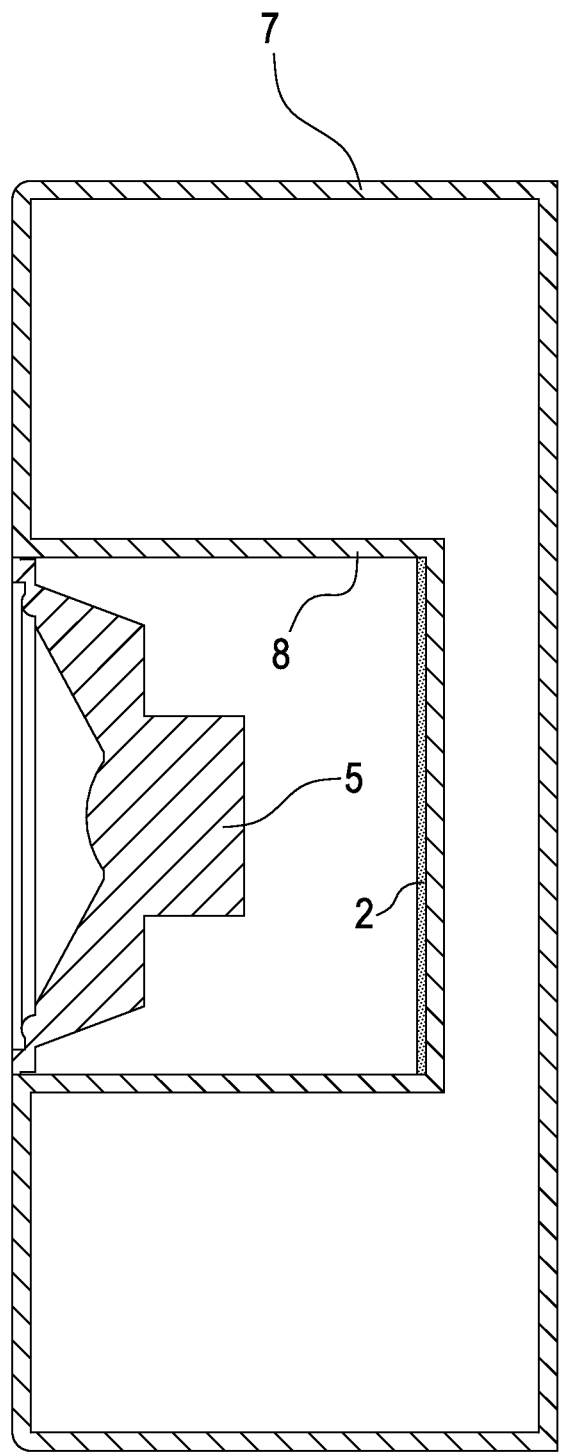
Figure 5:
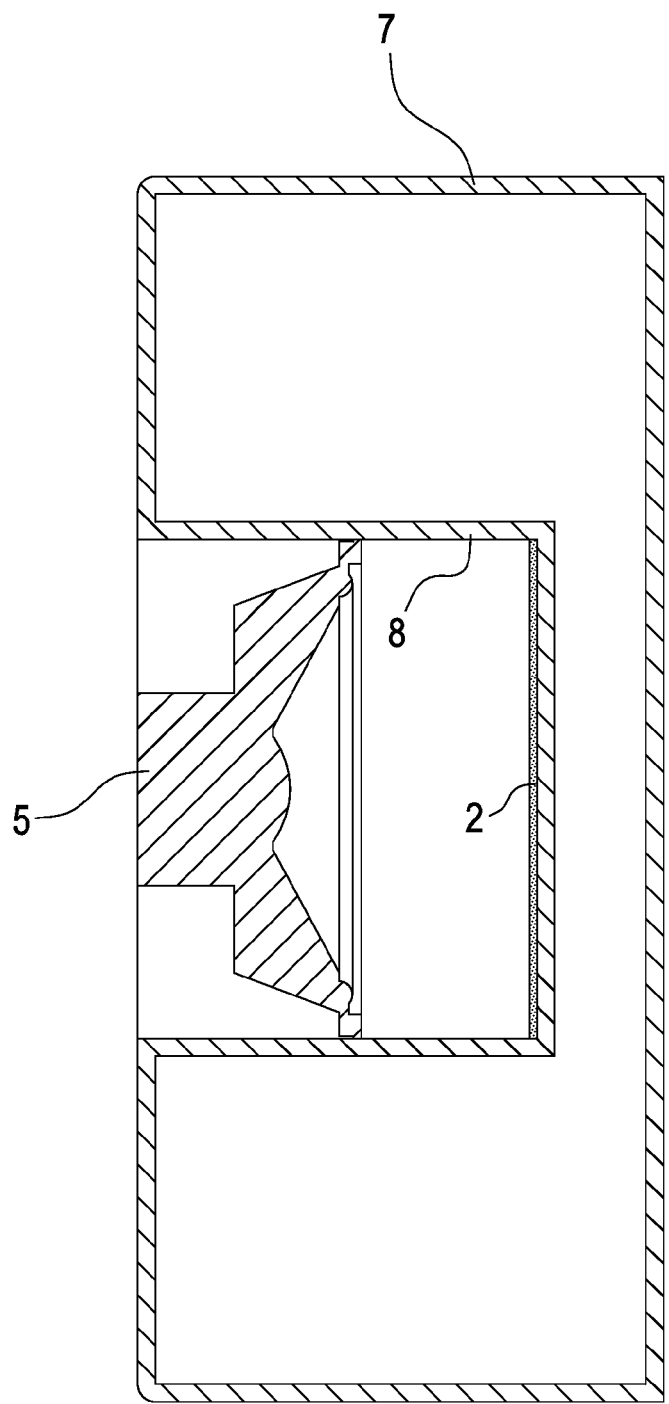
Figure 5:
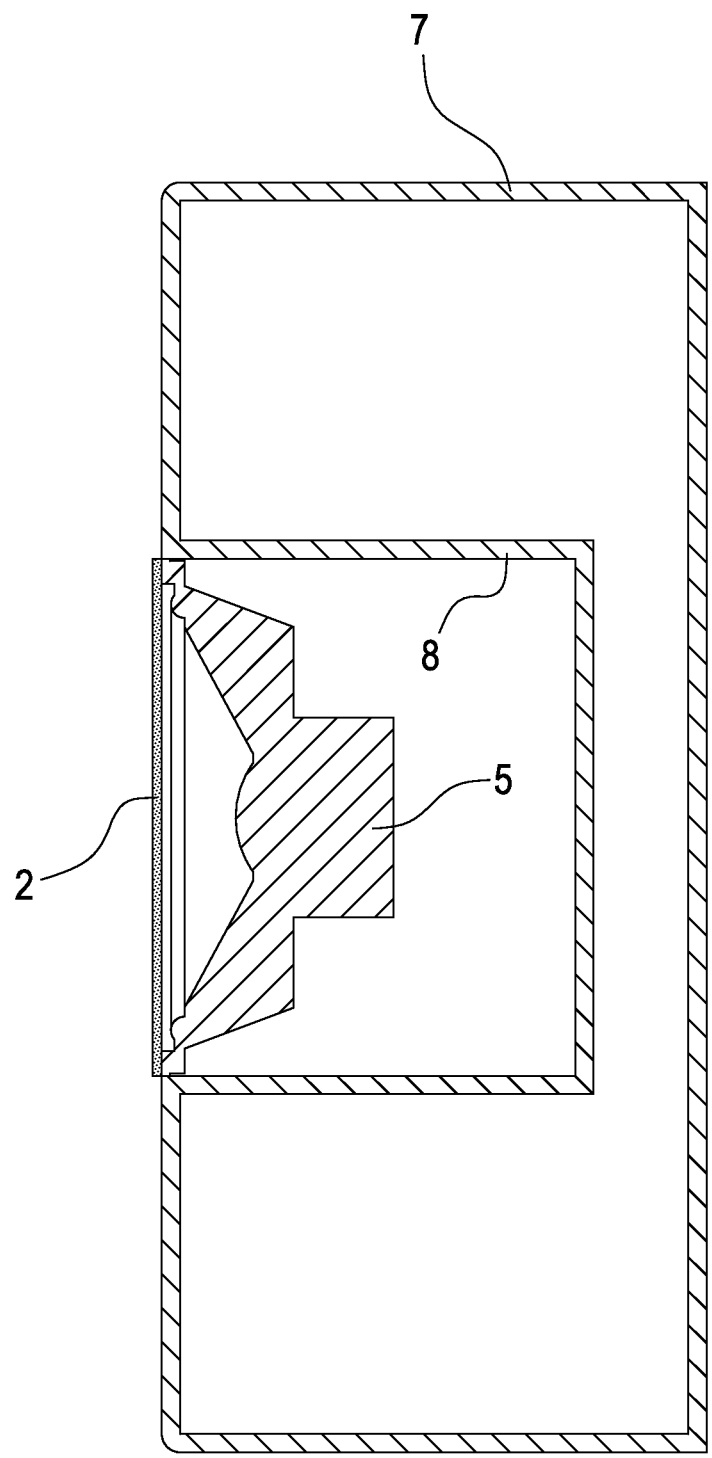
Figure 5:
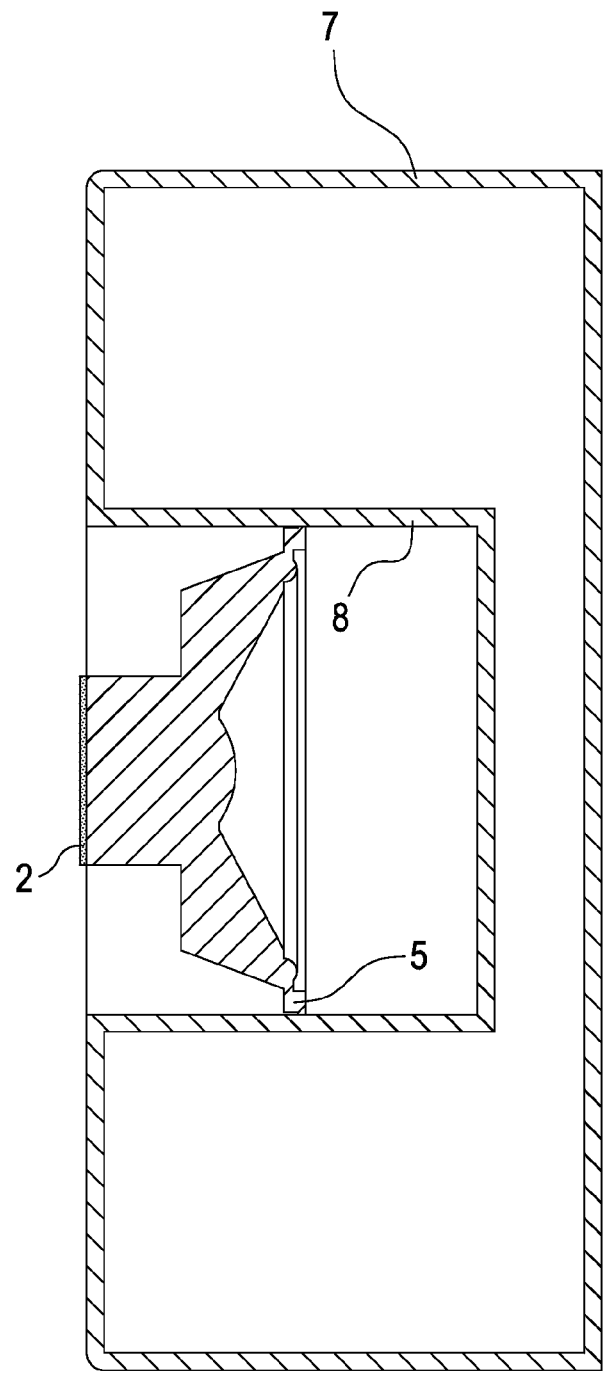

Referring to FIGS. 5A and 5B, film-type audio output apparatuses in accordance with a fifth embodiment of the present invention are shown in different configurations. The film-type audio output apparatus includes a case 7. Any side of the case 7 is concaved inby so as to define at least one receiving groove 8. At least one gas-permeable hole 6 is defined in any or more places of any side of the receiving groove 8. At least one film 2 is positioned at any or more places of an inner side and an outer side of the gas-permeable hole 6. At least one speaker unit 5 can be positioned forwardly or reversely at an opening of the receiving groove 8. The film 2 is made from any soft or elastic material. The present film-type audio output apparatus is thus formed via the above-mentioned components.

Referring to FIGS. 5C and 5D, the film-type audio output apparatuses in accordance with the fifth embodiment of the present invention are shown in different configurations. In these configurations, the film-type audio output apparatus includes a case 7. Any side of the case 7 is concaved inby so as to define at least one receiving groove 8. At least one film 2 is positioned at any place of an inner side of the receiving groove 8. At least one speaker unit 5 can be positioned forwardly or reversely at an opening of the receiving groove 8. The film 2 is made from any soft or elastic material. The present film-type audio output apparatus is thus formed via the above-mentioned components.

Referring to FIG. 5E, the film-type audio output apparatus in accordance with the fifth embodiment of the present invention is shown in a different configuration. In this configuration, the film-type audio output apparatus includes a case 7. Any side of the case 7 is concaved in so as to define at least one receiving groove 8. At least one speaker unit 5 is positioned forwardly at an opening of the receiving groove 8. At least one film 2 is positioned at any or more places of a front side of the speaker unit 5. The film 2 is made from any soft or elastic material. The present film-type audio output apparatus is thus formed via the above-mentioned components.

Referring to FIG. 5F, the film-type audio output apparatus in accordance with the fifth embodiment of the present invention is shown in a different configuration. In this configuration, the film-type audio output apparatus includes a case 7. Any side of the case 7 is concaved in so as to define at least one receiving groove 8. At least one speaker unit 5 is positioned reversely at an opening of the receiving groove 8. At least one film 2 is positioned at any or more places of a rear side of the speaker unit 5. The film 2 is made from any soft or elastic material. The present film-type audio output apparatus is thus formed via the above-mentioned components. Alternatively, the type of the speaker unit 5 shown in FIGS. 5A to 5F can also be the type of the embedded speaker unit 1.

Figure 6A:
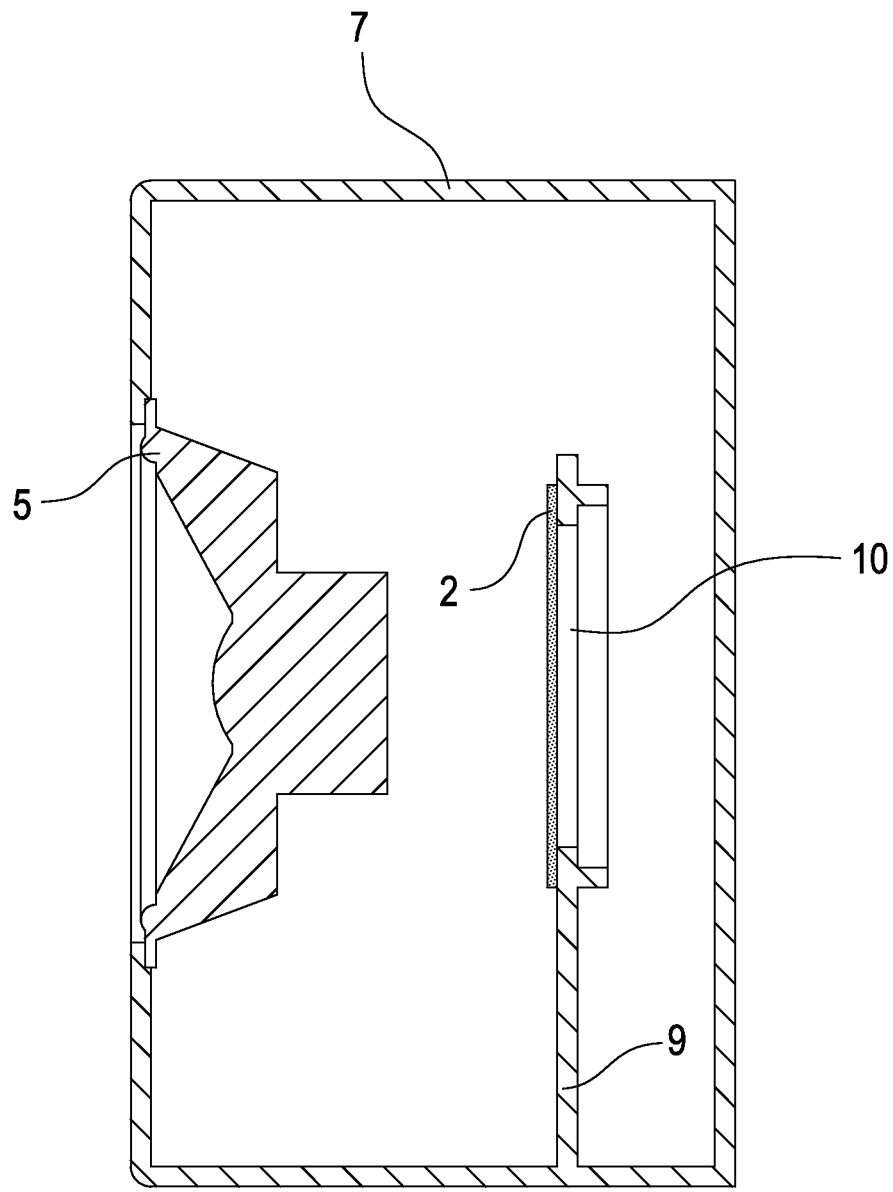
FIGS. 6A to 6C are side, cross sectional views of a film-type audio output apparatus in accordance with a sixth embodiment of the present invention.
Figure 6:
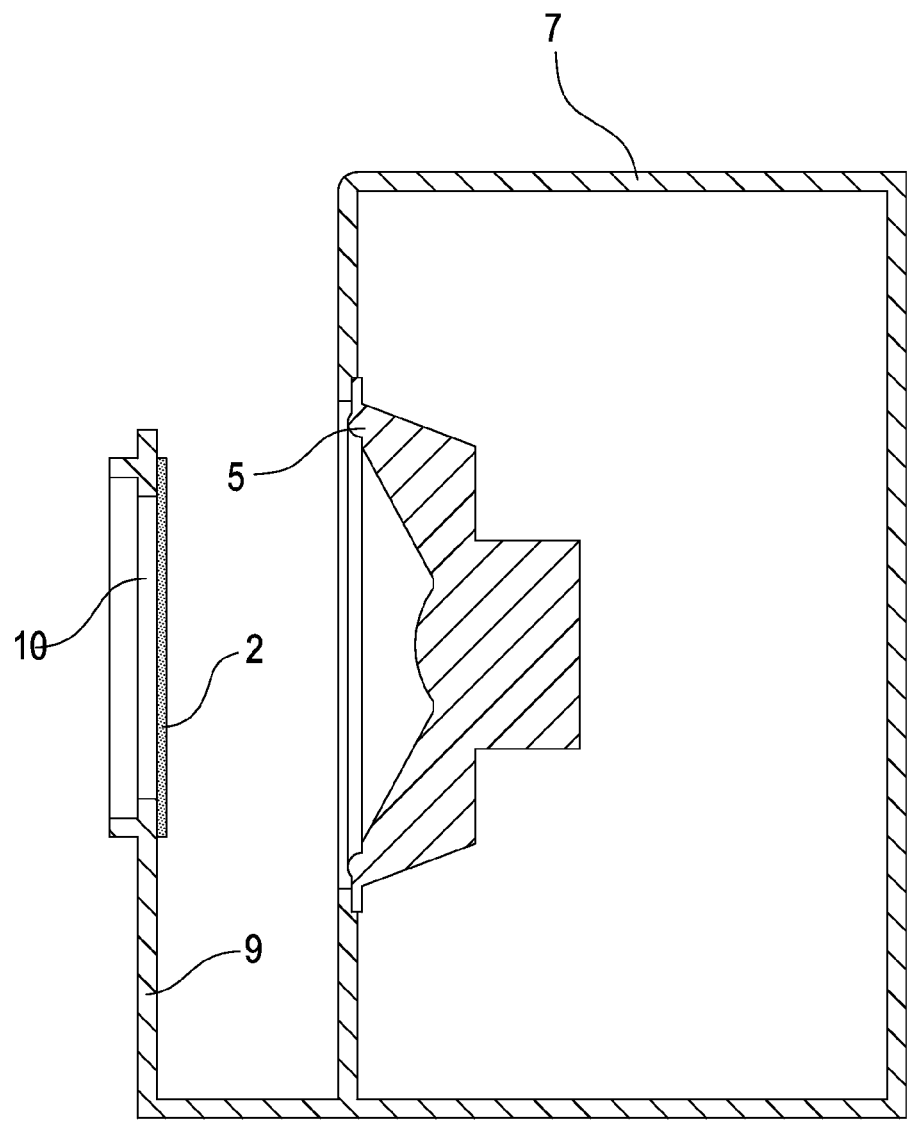
Figure 6:
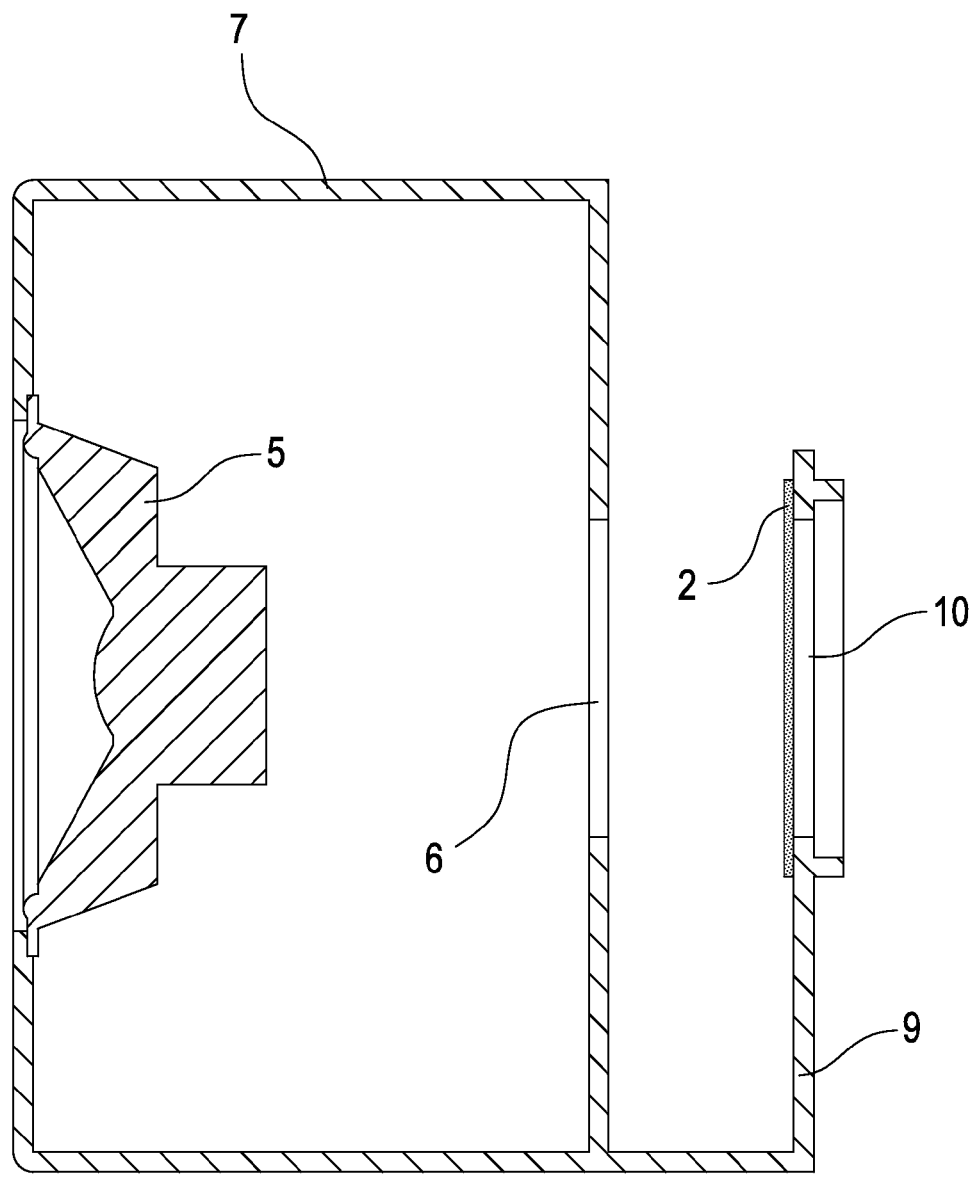

Referring to FIG. 6A, a film-type audio output apparatus in accordance with a sixth embodiment of the present invention is shown. The film-type audio output apparatus includes a case 7. At least one speaker unit 5 can be positioned forwardly or reversely at any side of the case 7. At least one bracket 9 is positioned at any or more places of any inner side of the case 7. At least one through hole 10 can be defined in the bracket 9 or not. At least one film 2 can be positioned at any or more places of any side of the bracket 9. For example, the at least one film 2 can be positioned at the through hole 10 of the bracket 9. The film 2 is made from any soft or elastic material. The present film-type audio output apparatus is thus formed via the above-mentioned components.

Referring to FIG. 6B, the film-type audio output apparatus in accordance with the sixth embodiment of the present invention is shown in a different configuration. In this configuration, the film-type audio output apparatus includes a case 7. At least one speaker unit 5 can be positioned forwardly or reversely at any side of the case 7. At least one bracket 9 is positioned at any or more places of the front side of the case 7. At least one through hole 10 can be defined in the bracket 9 or not. At least one film 2 can be positioned at any or more places of any side of the bracket 9. For example, the at least one film 2 can be positioned at the through hole 10 of the bracket 9. The film 2 is made from any soft or elastic material. The present film-type audio output apparatus is thus formed via the above-mentioned components.

Referring to FIG. 6C, the film-type audio output apparatus in accordance with the sixth embodiment of the present invention is shown in a different configuration. In this configuration, the film-type audio output apparatus includes a case 7. At least one speaker unit 5 can be positioned forwardly or reversely at any side of the case 7. At least one gas-permeable hole 6 is defined in any or more places of any side of the case 7. At least one bracket 9 is positioned at any or more places of the rear side of the case 7 and is opposite to the gas-permeable hole 6. At least one through hole 10 can be defined in the bracket 9 or not. At least one film 2 can be positioned at any or more places of any side of the bracket 9. For example, the at least one film 2 can be positioned at the through hole 10 of the bracket 9. The film 2 is made from any soft or elastic material. The present film-type audio output apparatus is thus formed via the above-mentioned components. Alternatively, the type of the speaker unit 5 shown in FIGS. 6A to 6C can also be the type of the embedded speaker unit 1.

Figure 7:
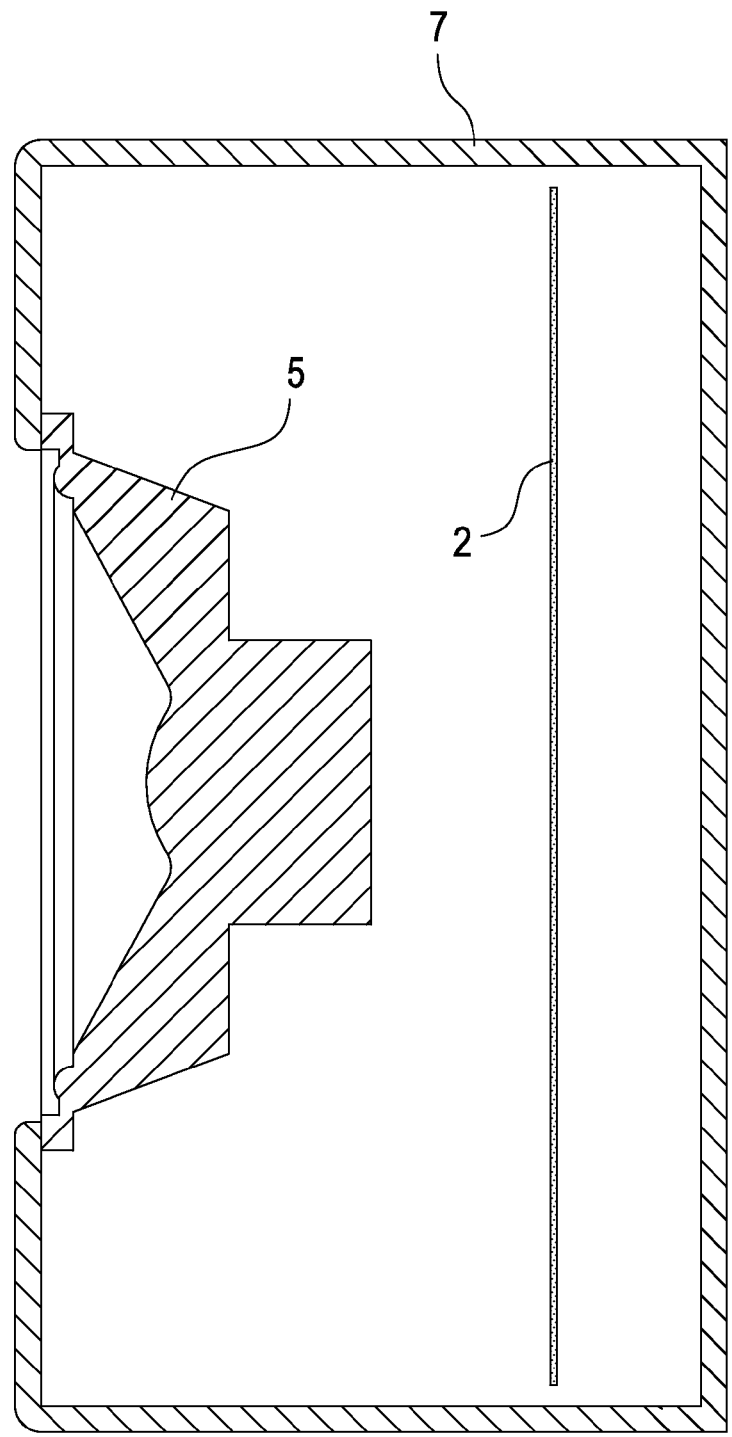
FIGS. 7A and 7B are side, cross sectional views of a film-type audio output apparatus in accordance with a seventh embodiment of the present invention.
Figure 7:
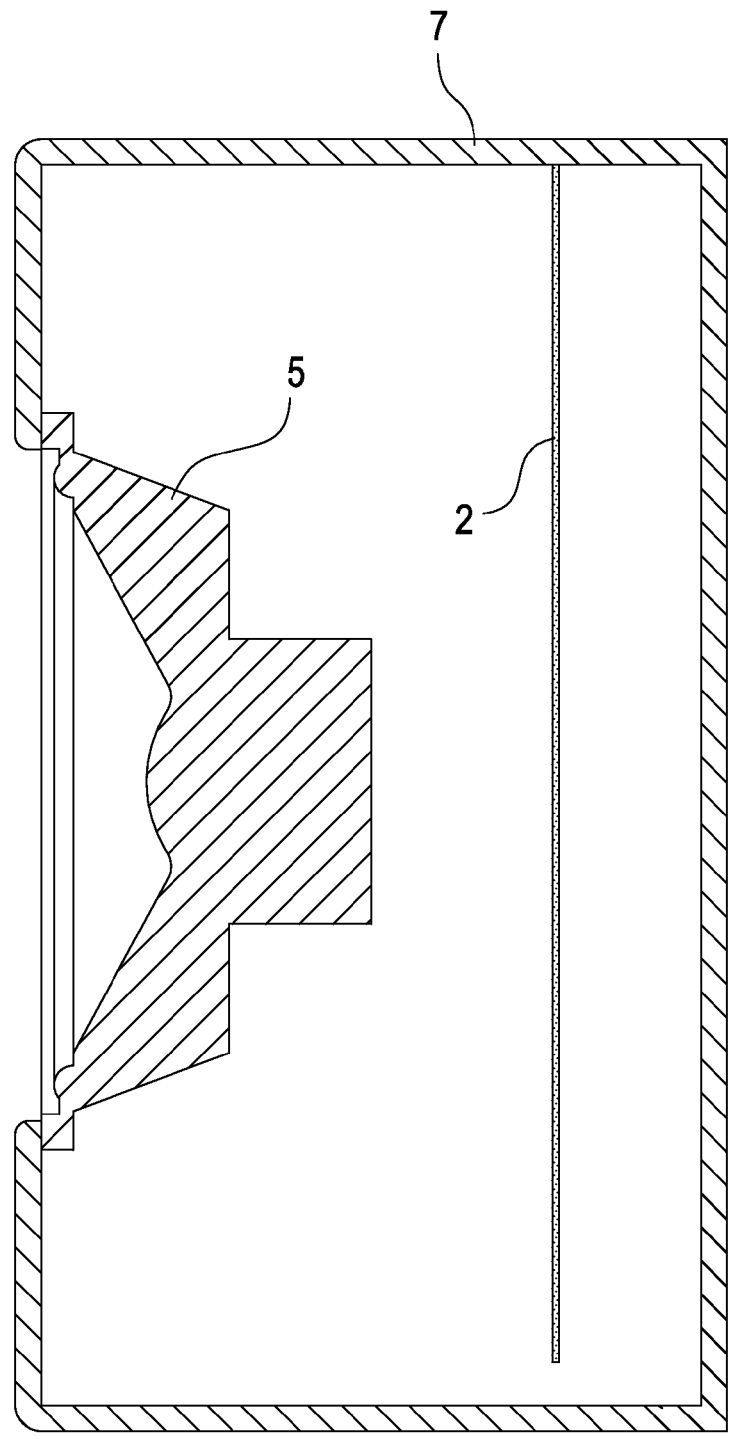

Referring to FIG. 7A, a film-type audio output apparatus in accordance with a seventh embodiment of the present invention is shown. The film-type audio output apparatus includes a case 7. At least one speaker unit 5 can be positioned forwardly or reversely at any side of the case 7. At least one film 2 can be positioned at any or more places of any inner side of the bracket 9 in a floating way. The film 2 is made from any soft or elastic material. The present film-type audio output apparatus is thus formed via the above-mentioned components.

Referring to FIG. 7B, the film-type audio output apparatus in accordance with the seventh embodiment of the present invention is shown in a different configuration. In this configuration, the film-type audio output apparatus includes a case 7. At least one speaker unit 5 can be positioned forwardly or reversely at any side of the case 7. At least one film 2 can be positioned at any or more places of any inner side of the bracket 9 in a part or fully fixed way. The film 2 is made from any soft or elastic material. The present film-type audio output apparatus is thus formed via the above-mentioned components.

Figure 8A:
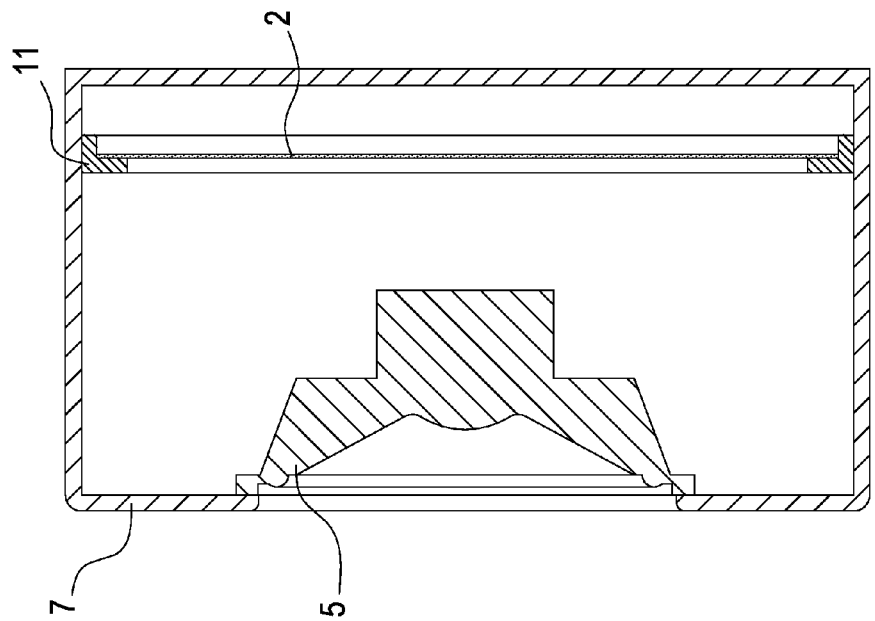
FIGS. 8A to 8C are side, cross sectional views of a film-type audio output apparatus in accordance with an eighth embodiment of the present invention.
Figure 8B:
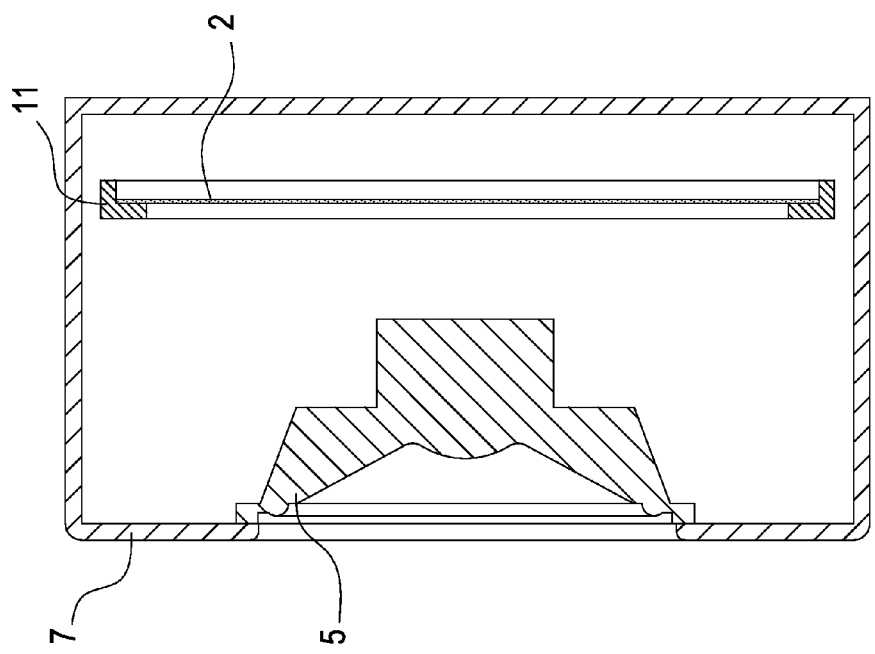
Figure 8C:
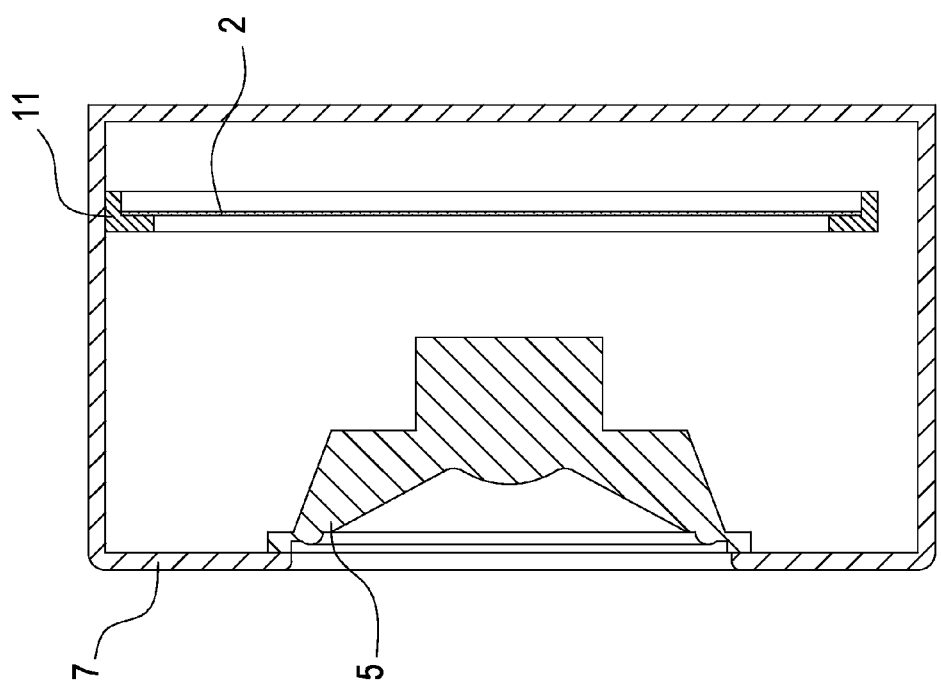

Referring to FIGS. 8A to 8C, film-type audio output apparatuses in accordance with an eighth embodiment of the present invention are shown in different configurations. In these configurations, each of the film-type audio output apparatuses includes a case 7. At least one speaker unit 5 can be positioned forwardly or reversely at any side of the case 7. At least one film 2 can be positioned at any or more places of any inner side of the case 7. Specifically, the film 2 can be positioned in a fully fixed way (as shown in FIG. 8A), a floating way (as shown in FIG. 8B), or a part fixed way (as shown in FIG. 8C). The film 2 is made from any soft or elastic material. The present film-type audio output apparatus is thus formed via the above-mentioned components. Alternatively, the type of the speaker unit 5 shown in FIGS. 7A to 7B, and FIGS. 8A to 8C can also be the type of the embedded speaker unit 1.

Referring to FIG. 9A, a film-type audio output apparatus in accordance with a ninth embodiment of the present invention is shown. The film-type audio output apparatus includes a case 7. At least one speaker unit 5 can be positioned forwardly or reversely at any side of the case 7. At least one gas-permeable hole 6 is defined in any or more places of any side of the case 7. At least one film 2 is positioned at any or more places of any inner side of the gas-permeable hole 6. The film 2 is made from any soft or elastic material. At least one clapboard (not shown) can also be positioned in the case 7 so as to separate the speaker units 5 in different spaces. The gas-permeable hole 6 can be defined in any or more places of any side of the spaces. The present film-type audio output apparatus is thus formed via the above-mentioned components.

Referring to FIG. 9B, the film-type audio output apparatus in accordance with the ninth embodiment of the present invention is shown in a different configuration. In this configuration, the film-type audio output apparatus includes a case 7. At least one speaker unit 5 can be positioned forwardly or reversely at any side of the case 7. At least one gas-permeable hole 6 is defined in any or more places of any side of the case 7. At least one film 2 is positioned at any or more places of any outer side of the gas-permeable hole 6. At least one protective cover 12 covers the at least one film 2, respectively. The film 2 is made from any soft or elastic material. At least one clapboard (not shown) can also be positioned in the case 7, so as to separate the speaker units 5 in different spaces. The gas-permeable hole 6 can be defined in any or more places of any side of the spaces. The present film-type audio output apparatus is thus formed via the above-mentioned components.

Figure 9D:
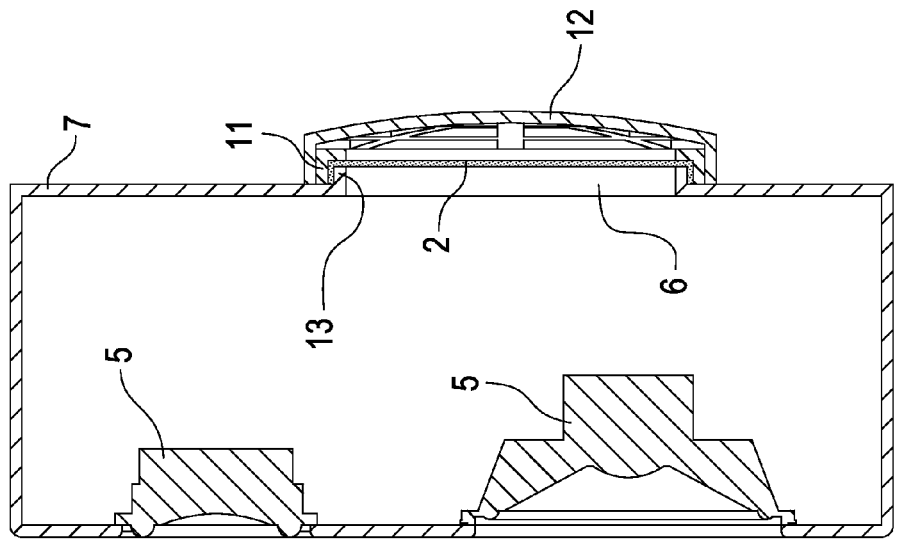
Figure 9C:
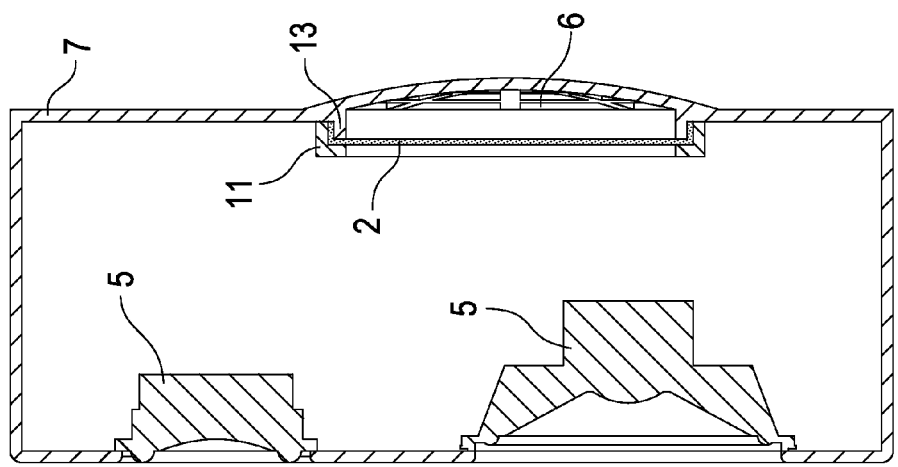

Referring to FIG. 9C, the film-type audio output apparatus in accordance with the ninth embodiment of the present invention is shown in a different configuration. In this configuration, the film-type audio output apparatus includes a case 7. At least one speaker unit 5 can be positioned forwardly or reversely at any side of the case 7. At least one gas-permeable hole 6 is defined in any or more places of any side of the case 7. At least one protuberant post 13 is positioned in the case 7 and each extends from one of the gas-permeable hole 6. A combined part 11 combining the at least one film 2 is fixed on the protuberant post 13. The film 2 is made from any soft or elastic material. At least one clapboard (not shown) can also be positioned in the case 7 so as to separate the speaker units 5 in different spaces. The gas-permeable hole 6 can be defined in any or more places of any side of the spaces. The present film-type audio output apparatus is thus formed via the above-mentioned components.

Referring to FIG. 9D, the film-type audio output apparatus in accordance with the ninth embodiment of the present invention is shown in a different configuration. In this configuration, the film-type audio output apparatus includes a case 7. At least one speaker unit 5 can be positioned forwardly or reversely at any side of the case 7. At least one gas-permeable hole 6 is defined in any or more places of any side of the case 7. At least one protuberant post 13 is positioned out the case 7 and each extends from one of the gas-permeable hole 6. A combined part 11 combining the at least one film 2 is fixed on the protuberant post 13. A protective cover 12 covers an outer side of the combined part 11. The film 2 is made from any soft or elastic material. At least one clapboard (not shown) can also be positioned in the case 7, so as to separate the speaker units 5 in different spaces. The gas-permeable hole 6 can be defined in any or more places of any side of the spaces. The present film-type audio output apparatus is thus formed via the above-mentioned components. Alternatively, the type of the speaker unit 5 shown in FIGS. 9A to 9D can also be the type of the embedded speaker unit 1.

Referring to FIGS. 10A and 10B, the embodiments shown in FIGS. 1 to 9 can be arranged in pairs or groups, and can also be applied to various audio output apparatuses or various products relating to sound. Because the at least one film is positioned at appropriate place(s), the audio output apparatus can achieve efficacies of softer undertone and wider diapason.

Referring to FIG. 11A, a film-type audio output apparatus in accordance with a tenth embodiment of the present invention is shown. The film-type audio output apparatus includes an earphone 14. The earphone 14 includes at least one speaker unit 5, at least one film 2 positioned at any or more places of any side of the speaker unit 5, and an earphone housing 15. The earphone 14 can further includes an earphone tube 16. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Figure 11B:
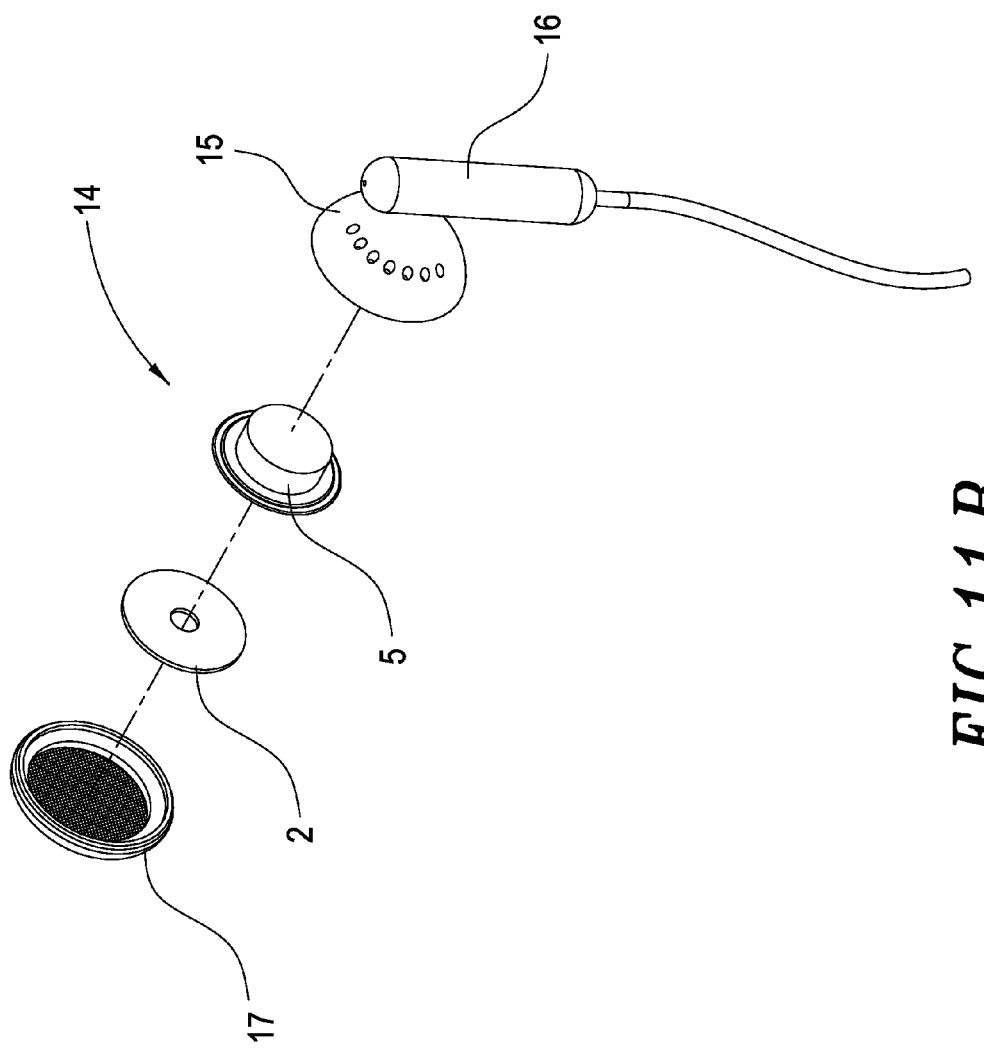

Referring to FIG. 11B, the film-type audio output apparatus in accordance with the tenth embodiment of the present invention is shown in a different configuration. In this configuration, the film-type audio output apparatus includes an earphone 14. The earphone 14 includes an earphone net cover 17, at least one speaker unit 5, at least one film 2 positioned at any or more places of any side between the earphone net cover 17 and the at least one speaker unit 5, and an earphone housing 15. The earphone 14 can further includes an earphone tube 16. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Figure 11C:
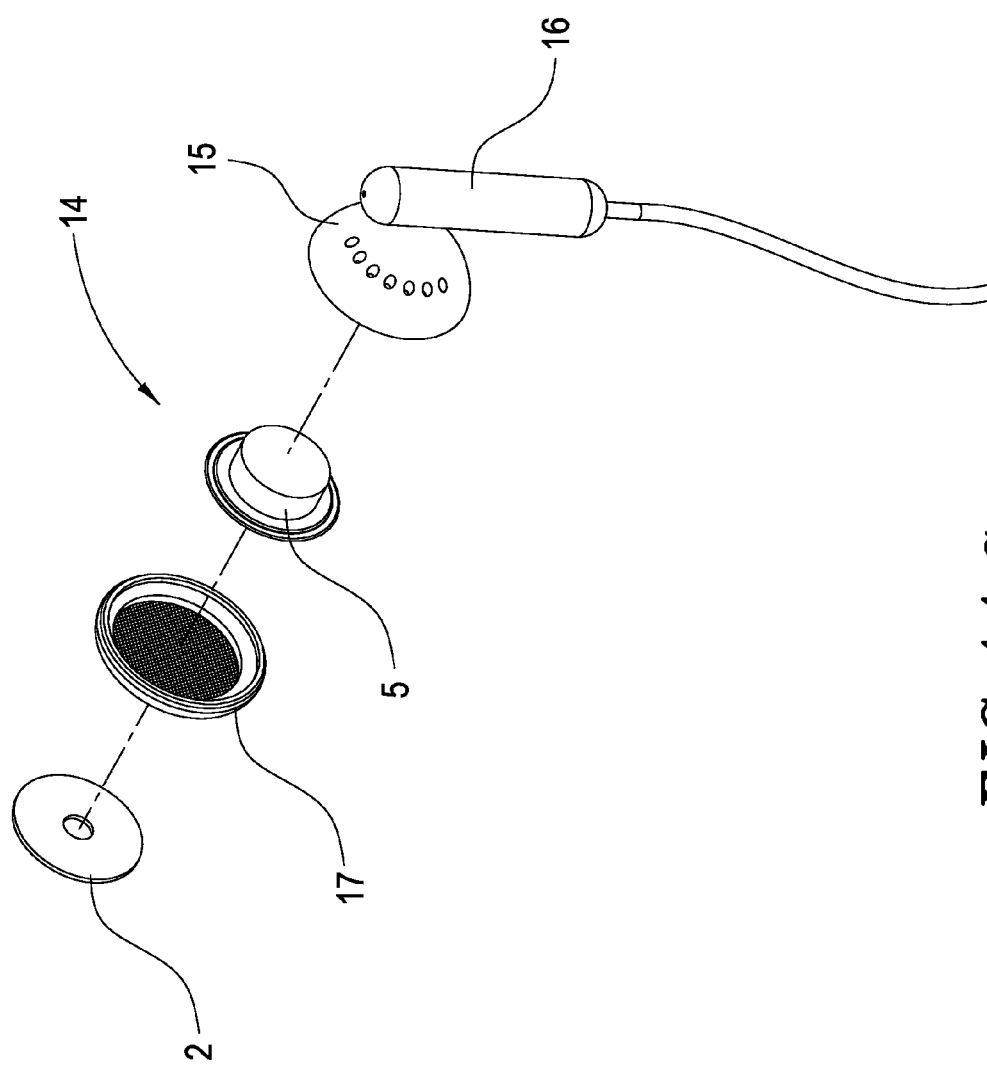

Referring to FIG. 11C, the film-type audio output apparatus in accordance with the tenth embodiment of the present invention is shown in a different configuration. In this configuration, the film-type audio output apparatus includes an earphone 14. The earphone 14 includes an earphone net cover 17, at least one film 2 positioned at any or more places of an outer side of the earphone net cover 17, at least one speaker unit 5 positioned at a rear side of the earphone net cover 17, and an earphone housing 15. The earphone 14 can further includes an earphone tube 16. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Figure 11E:
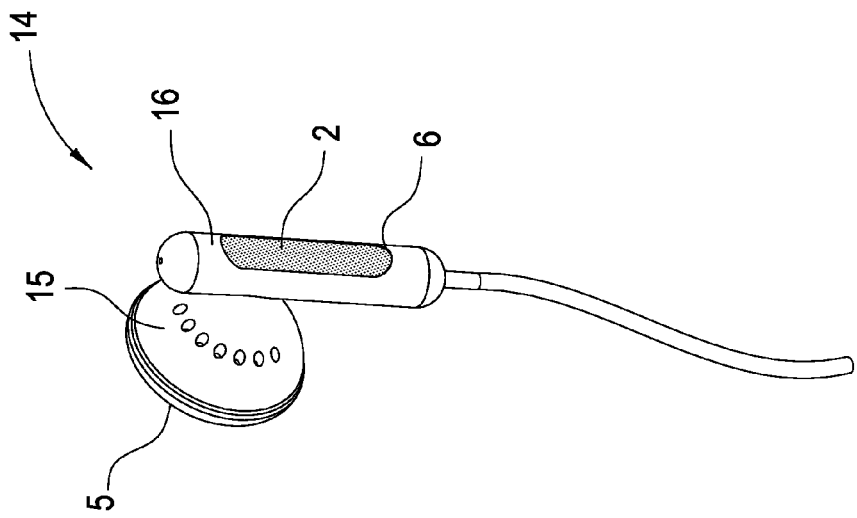
Figure 11D:
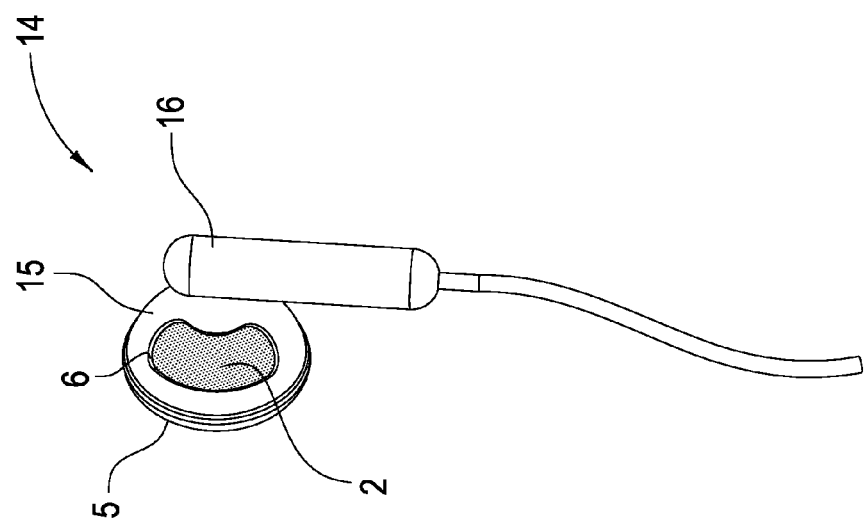

Referring to FIG. 11D, the film-type audio output apparatus in accordance with the tenth embodiment of the present invention is shown in a different configuration. In this configuration, the film-type audio output apparatus includes an earphone 14. The earphone 14 includes at least one speaker unit 5, an earphone housing 15 connected to the at least one speaker unit 5 and positioned at the rear side of the at least one speaker unit 5, and at least one film 2. At least one gas-permeable hole 6 is defined in any or more places of any side of the earphone housing 15. The at least one film 2 is positioned at any or more places of an inner side and an outer side of the gas-permeable hole 6. The earphone 14 can further includes an earphone tube 16. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Referring to FIG. 11E, the film-type audio output apparatus in accordance with the tenth embodiment of the present invention is shown in a different configuration. In this configuration, the film-type audio output apparatus includes an earphone 14. The earphone 14 includes at least one speaker unit 5, an earphone housing 15 connected to the at least one speaker unit 5 and positioned at the rear side of the at least one speaker unit 5, an earphone tube 16, and at least one film 2. At least one gas-permeable hole 6 is defined in any or more places of any side of the earphone tube 16. The at least one film 2 is positioned at any or more places of an inner side and an outer side of the gas-permeable hole 6. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Figure 11G:
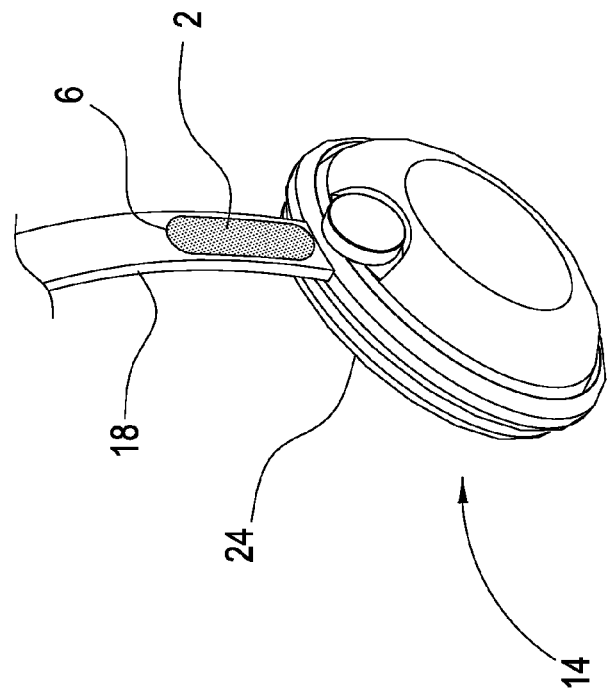
Figure 11F:
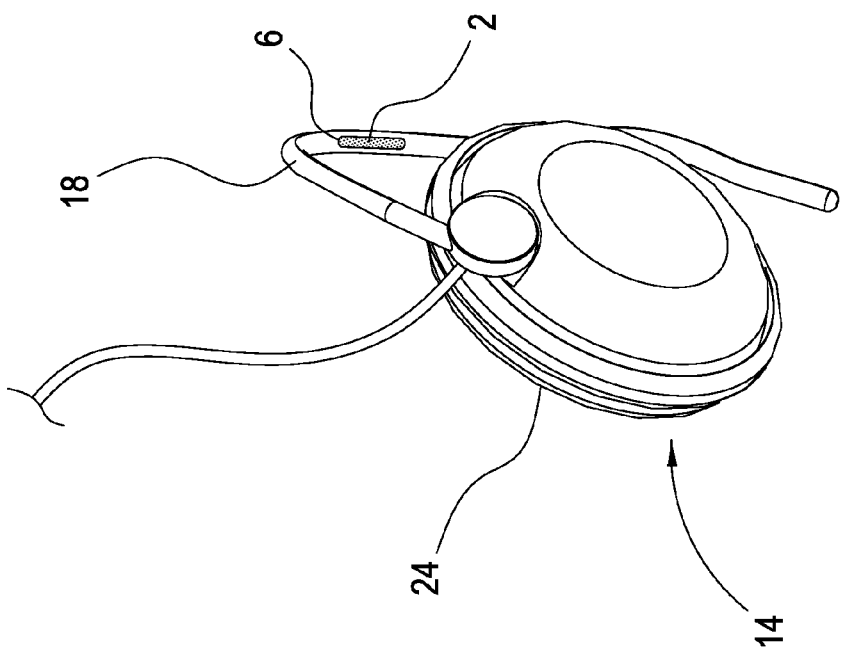

Referring to FIGS. 11F and 11G, the film-type audio output apparatus in accordance with the tenth embodiment of the present invention is shown in different configurations. In these configurations, each of the film-type audio output apparatuses includes an earphone 14. The earphone 14 includes an earphone structural part 24, at least one ear hook tube 18 positioned at any or more places of any side of the earphone structural part 24, and at least one film 2. At least one gas-permeable hole 6 is defined in any or more places of any side of the ear hook tube 18. The at least one film 2 is positioned at any or more places of an inner side and an outer side of the gas-permeable hole 6. The earphone can be divided into a single-side and individual-tone earphone, and a double-side and stereophonic earphone. Structures of the earphone can be an ear canal type, an earplug type, an ear hook type, a headset type, a detachable type, etc. The film 2 is made from any soft or elastic material. The present film-type audio output apparatus is thus formed via the above-mentioned components.

Alternatively, the at least one speaker unit 5 can be positioned reversely in the earphone shown in FIGS. 11A to 11G, while the sound can achieve the same resonance effect. In addition, the type of the speaker unit 5 shown in FIGS. 11A to 11G can also be the type of the embedded speaker unit 1 shown in FIGS. 1A to 1C.

Also, the embodiments shown in FIGS. 1 to 11 can be arranged in pairs or groups, and can also be applied to various earphones.

Figure 12:
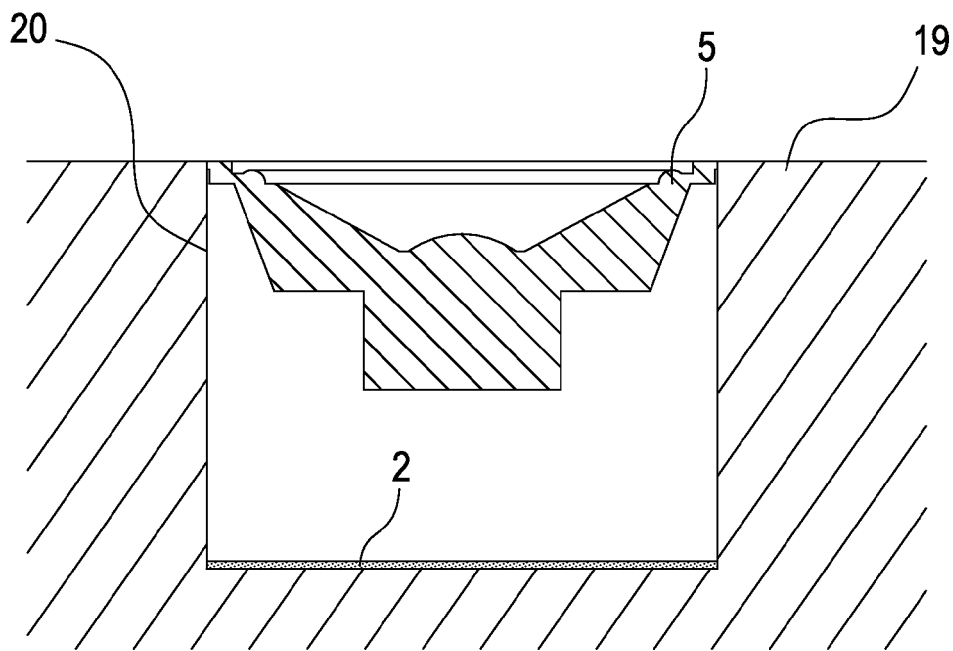
FIGS. 12A to 12C are applied views of the present film-type audio output apparatus.
Figure 12:
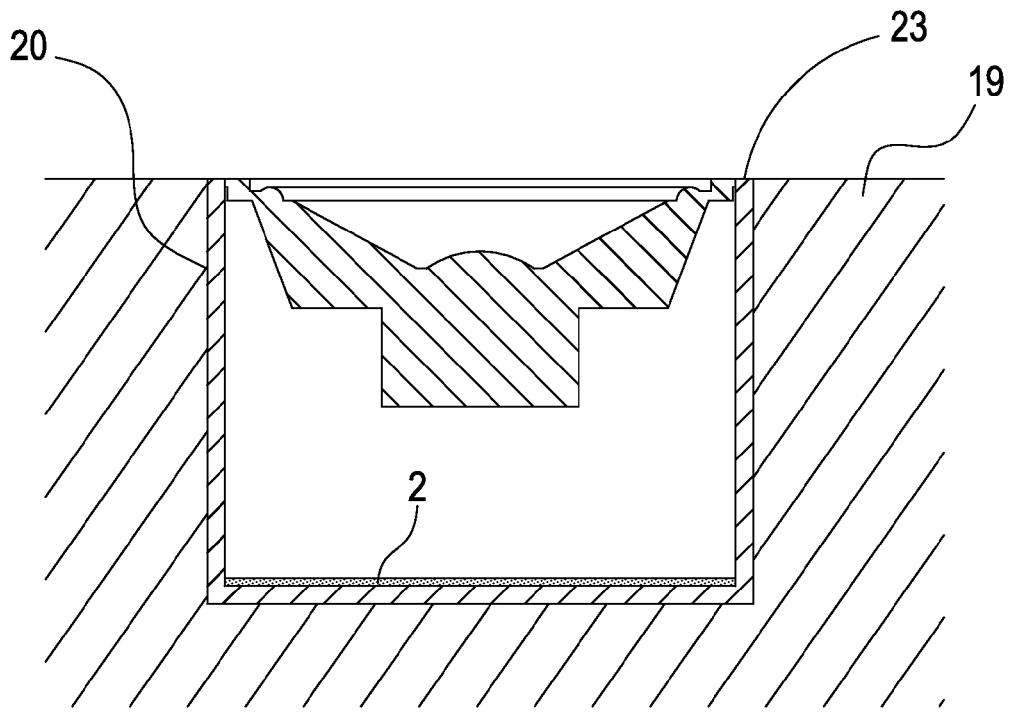
Figure 12:
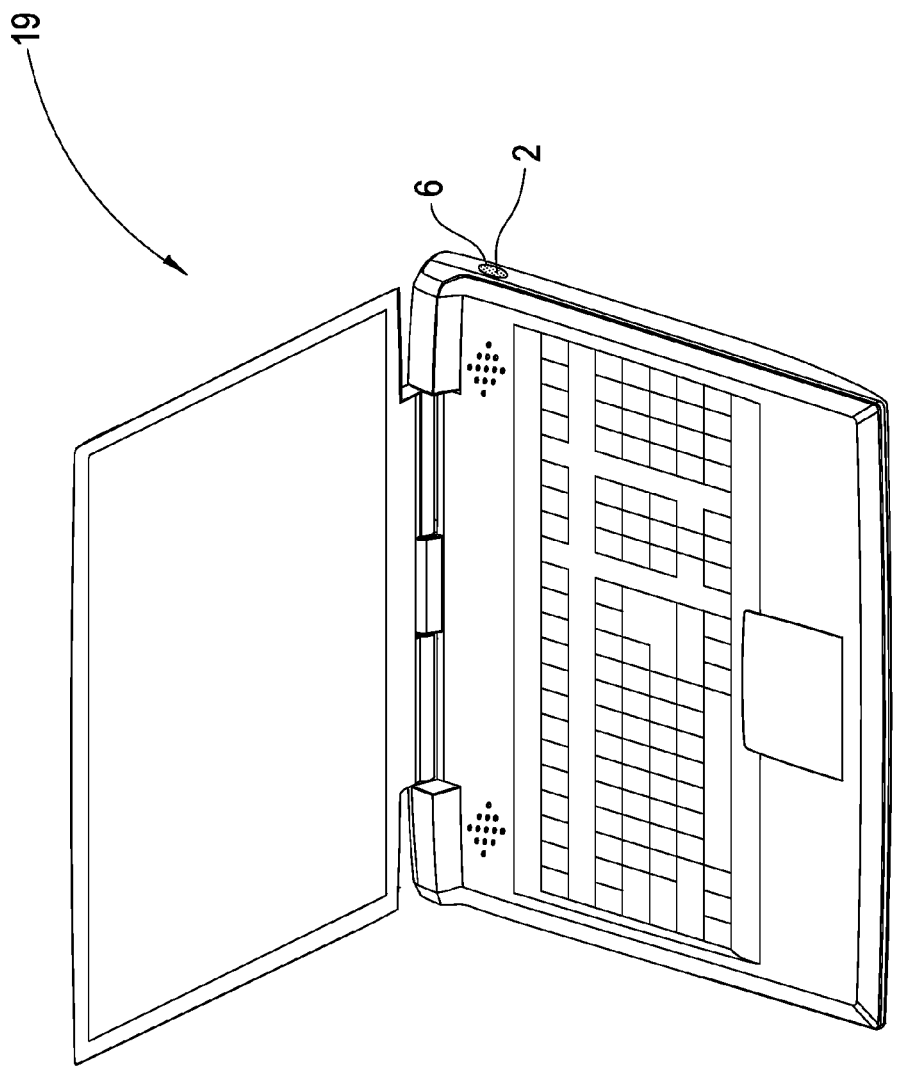
Figure 13:
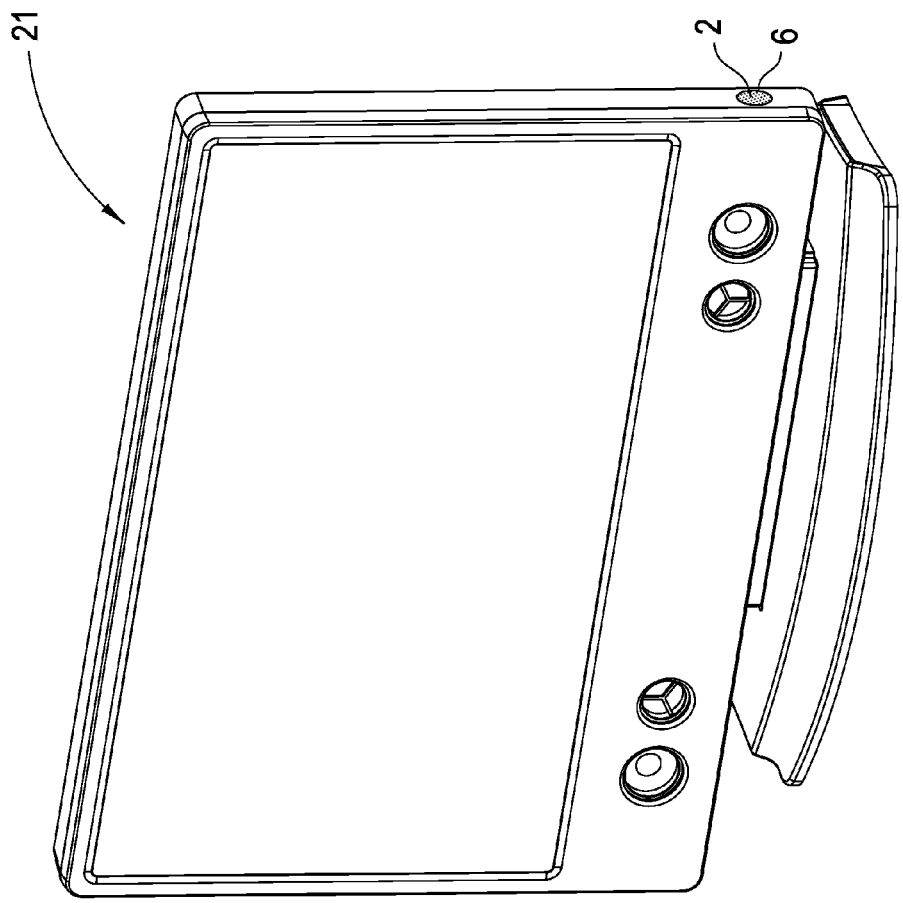
FIGS. 13 and 14 are isometric, applied views of the present film-type audio output apparatus.
Figure 14:
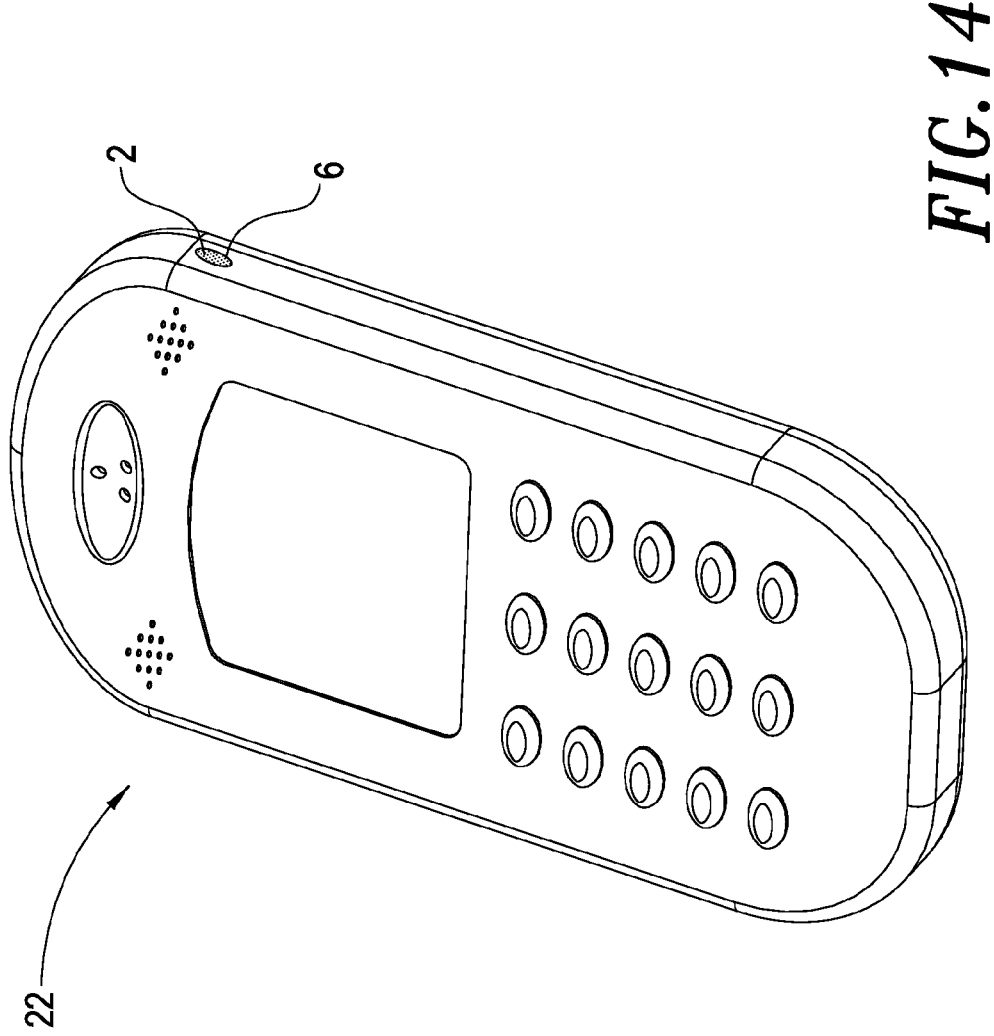

Referring to FIGS. 12A to 12C, and FIGS. 13 to 14, applicable electric products using the present audio output apparatuses are shown. The present invention can also be applied to various audio output apparatuses or electric products, such as earphones, speaker units, speaker boxes, notebook computers, displays, mobile telephones, conventional telephones, vehicle acoustics, vehicle speaker boxes, family acoustics, family speaker boxes, stereo speaker boxes, and so on. Referring to FIG. 12A, a notebook computer 19 using the present invention is shown. Specifically, the notebook computer 19 defines a speaker groove 20 therein, and at least one film 2 is positioned at any or more places of an inner side of the speaker groove 20. At least one speaker unit 5 is positioned at an opening of the speaker groove 20. Also referring to FIG. 12B, at least one case 7 (not shown) or at least one speaker box 23 with film 2 can be positioned at any or more places of the inner side of the speaker groove 20. The type of the case 7 or the speaker box 23 can be the types shown in FIGS. 2A and 2B, FIGS. 3A to 3E, FIG. 4 and FIGS. 5A to 5F. Furthermore, referring to FIG. 12C, at least one speaker unit (not shown) is positioned at any or more places of any side of the housing of the notebook computer 19. At least one gas-permeable hole 6 is defined in any or more places of any side of the housing of the notebook computer 19. At least one film 2 is positioned at any or more places of an inner side and an outer side of the gas-permeable hole 6. Referring to FIGS. 13 and 14, the present invention can also be applied to a display 21 or a mobile telephone 22. Specifically, at least one speaker unit (not shown) is positioned at any or more places of any side of the housing of the display 21 or the mobile telephone 22. At least one gas-permeable hole 6 is defined in any or more places of any side of the housing of the display 21 or the mobile telephone 22. At least one film 2 is positioned at any or more places of an inner side and an outer side of the gas-permeable hole 6. The display 21 or the mobile telephone 22 can both have efficacies of softer undertone and wider diapason. Above-mentioned embodiments of the notebook computer, display or mobile telephone can also be applied to various audio output apparatuses or products relating to sound.

In addition, the films 2 in FIGS. 1 to 14 can be positioned at desirable places of various audio output apparatuses or various electric products using over molding manner or other methods.

The film-type audio output apparatuses provided by the present invention have following advantages. Firstly, the present invention provides a film-type audio output apparatus that can generate softer undertone and wider diapason. The film-type audio output apparatus includes a film made from any soft or elastic material and positioned at any or more places of an inner side and an outer side thereof. Alternatively, the film-type audio output apparatus includes a combined part positioned at any or more places of the inner side and the outer side thereof, and the combined part combines the at least one film. Secondly, the present invention provides a film-type audio output apparatus that can be applied to various audio output apparatuses, or various products relating to sound, so as to improve quality of tone, sound effect and diapason of the products, and improve popularization, actualization and usage of the products. Thirdly, the present invention provides a film-type audio output apparatus that is simple in structure and manufacture and is low in cost.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A film-type audio output apparatus, comprising
   a speaker unit having a protector on the speaker unit;
   an earphone structural part having at least one gas-permeable hole to release sound pressure;
   an earphone net cover;
   at least one elastic film positioned at a predetermined place between the earphone net cover and the speaker unit to have a softer undertone and wider diapason; and
   an aperture disposed at the center of the at least one elastic film to release sound pressure.

* * * * *